(12) United States Patent
Yasui et al.

(10) Patent No.: US 7,188,022 B2
(45) Date of Patent: Mar. 6, 2007

(54) CONTROLLER

(75) Inventors: Yuji Yasui, Saitama-ken (JP); Koichiro Shinozaki, Saitama-ken (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/389,131

(22) Filed: Mar. 27, 2006

(65) Prior Publication Data

US 2006/0229794 A1 Oct. 12, 2006

(30) Foreign Application Priority Data

Apr. 7, 2005 (JP) .............................. 2005-110680

(51) Int. Cl.
| | |
|---|---|
| *F02D 41/14* | (2006.01) |
| *G05B 13/02* | (2006.01) |
| *F02M 49/00* | (2006.01) |

(52) U.S. Cl. ..................... 701/103; 701/112; 700/38
(58) Field of Classification Search ................ 701/103, 701/105, 112, 115, 102; 123/198 F, 436; 700/38, 282

See application file for complete search history.

(56) References Cited

U.S. PATENT DOCUMENTS

| | | | | |
|---|---|---|---|---|
| 3,688,495 A | * | 9/1972 | Fehler et al. ............ 60/39.281 |
| 4,944,194 A | * | 7/1990 | Tanoue et al. ................ 74/335 |
| 4,993,389 A | * | 2/1991 | Ahlborn et al. ............. 701/111 |
| 5,268,834 A | | 12/1993 | Sanner et al. | |
| 5,582,150 A | * | 12/1996 | Reed et al. ............ 123/406.47 |
| 6,000,375 A | * | 12/1999 | Isobe ......................... 123/322 |
| 6,904,355 B2 | * | 6/2005 | Yasui et al. ................. 701/108 |
| 2004/0176903 A1 | | 9/2004 | Yasui | |

FOREIGN PATENT DOCUMENTS

WO 2005/015325 A1 2/2005

* cited by examiner

*Primary Examiner*—Hieu T. Vo
(74) *Attorney, Agent, or Firm*—Arent Fox PLLC

(57) ABSTRACT

A controller which is capable of improving the resolution and accuracy of control even when controlling a plant including a control region in which nonlinearities are temporarily very strongly exhibited and a control region in which the nonlinearities are hardly exhibited. A controller 1 which controls fuel pressure Pf of a fuel supply system 10 includes an ECU 2. The ECU 2 sets a target fuel pressure Pf_cmd, calculates a first control input Rsld for causing the fuel pressure Pf to converge to the target fuel pressure Pf_cmd, with equations (1) to (6), modulates the first control input Rsld with equations (11) to (31) to thereby calculate a second control input Udsm, and depending on whether or not during fuel-cut operation or pressure decreasing control, selects one of the first and second control inputs Rsld and Udsm as the control input Upf.

12 Claims, 9 Drawing Sheets

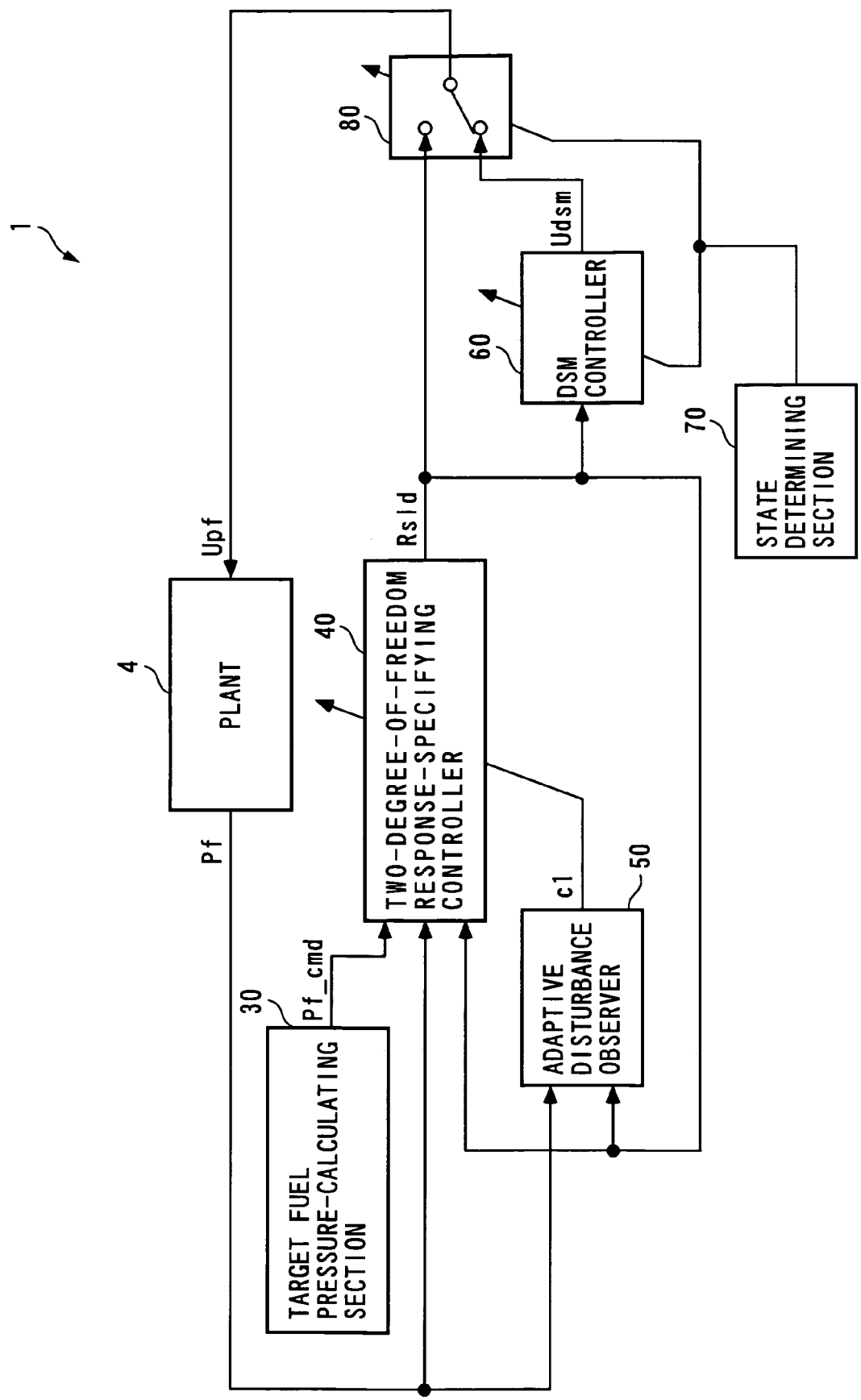

F I G. 6
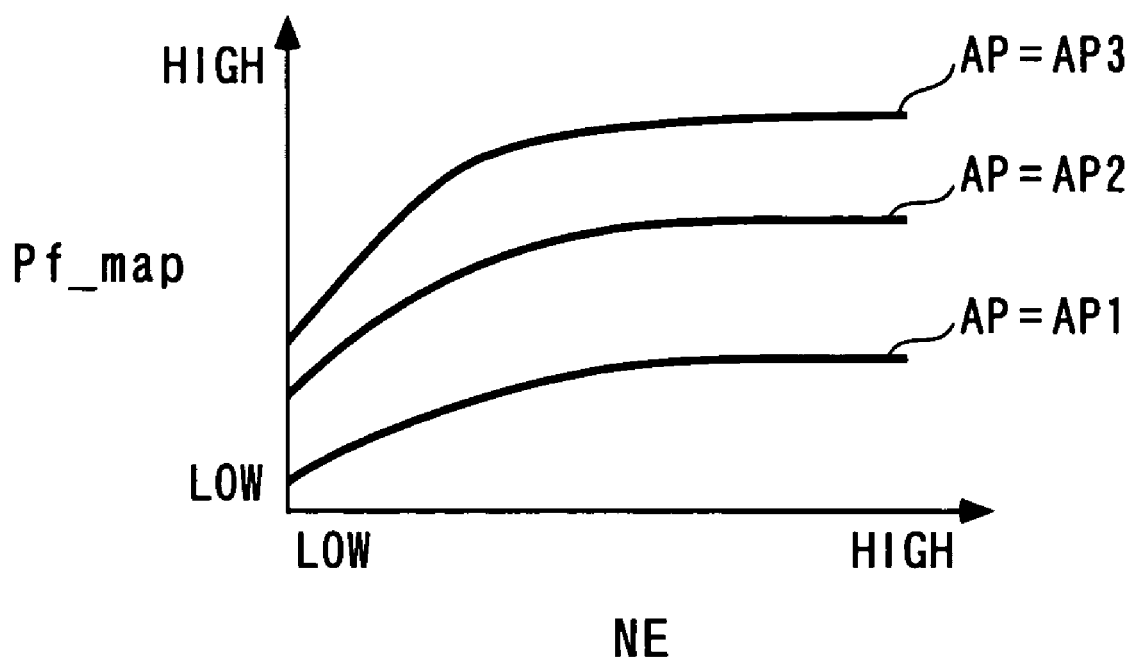

CONTROLLER

BACKGROUND OF THE INVENTION

1. Field of the Invention

The present invention relates to a controller for controlling the control amount of a plant that has nonlinearities, such as hysteresis and dead zone.

2. Description of the Related Art

A controller of the above-mentioned kind has already been proposed by the present assignee as disclosed in Japanese Laid-Open Patent Publication (Kokai) No. 2005-63003. This controller controls the cam phase as a control amount by inputting a control input to an electromagnetically-driven variable cam phase mechanism as a plant, and includes a two-degree-of-freedom sliding mode controller and a DSM controller. The two-degree-of-freedom sliding mode controller calculates an SLD control input for causing the cam phase to converge to a target value, with a target value filter-type two-degree-of-freedom sliding mode control algorithm.

Further, the DSM controller calculates the control input to the variable cam phase mechanism, by modulating the calculated SLD control input with an algorithm to which is applied a $\Delta\Sigma$ modulation algorithm, such that the control input is frequently inverted with a predetermined amplitude with respect to a predetermined value as the center. As a result, even when controlling the cam phase via the variable cam phase mechanism having nonlinearities, it is possible to control the cam phase by the control input frequently repeating the invention such that the cam phase is caused to converge to the target value while compensating for the nonlinearities. This makes it possible to control the cam phase in a fine-grained manner, and maintain both the resolution and the control accuracy of cam phase control at high levels.

Assuming that the controller as disclosed in Japanese Laid-Open Patent Publication (Kokai) No. 2005-63003 is applied to a plant including a control region in which nonlinearities are temporarily very strongly exhibited and a control region in which the nonlinearities are hardly exhibited, when the plant is in the control region in which the nonlinearities are exhibited, there occurs a state in which the control amount largely deviates from the target value, and the SLD control input is calculated as a value that changes over a larger variation range than when the plant is in the control region in which the nonlinearities are hardly exhibited. For this reason, to compensate for the nonlinearities, the amplitude of the control input is required to be set to a value large enough to cover the SLD control input having such a larger variation range. If the amplitude of the control input is set to such a value, however, when the plant is in the control region where the nonlinearities are hardly exhibited, under conditions of the sensitivity of the control amount to the control input being low, particularly under conditions of the frequency sensitivity, more specifically, the high-frequency cut properties being low, the large amplitude of the control input is reflected on the control amount in a noise-like fashion, which can degrade the resolution and accuracy of the control.

SUMMARY OF THE INVENTION

It is an object of the present invention to provide a controller which is capable of improving the resolution and accuracy of control even when controlling a plant including a control region in which nonlinearities are temporarily very strongly exhibited and a control region in which the nonlinearities are hardly exhibited.

To attain the above object, in a first aspect of the present invention, there is provided a controller that controls a control amount of a plant by a control input, comprising control amount-detecting means for detecting the control amount, target value-setting means for setting a target value as a target of the control amount, first control input-calculating means for calculating a first control input for controlling the detected control amount such that the detected control amount is caused to converge to the set target value, with a predetermined control algorithm, second control input-calculating means for calculating a second control input by modulating the first control input with an algorithm to which is applied a predetermined modulation algorithm, and control input-selecting means for selecting one of the first control input and the second control input as the control input, depending on conditions of the plant.

With the configuration of the controller according to the first aspect of the present invention, the first control input for controlling the control amount such that the control amount is caused to converge to the target value is calculated with a predetermined control algorithm, and the second control input is calculated by modulating the first control input with an algorithm to which is applied a predetermined modulation algorithm. Further, depending on the conditions of the plant, one of the first control input and the second control input is selected. Therefore, in the case of the plant including a control region in which nonlinearities are temporarily very strongly exhibited, and a control region in which the nonlinearities are hardly exhibited, when the plant is in the control region in which the nonlinearities are exhibited, the second control input is selected as the control input, whereby it is possible to cause the control amount to converge to the target value while compensating for the strong nonlinearities of the plant. As a result, compared with the case of selecting the first control input as the control input in the control region in which the nonlinearities are exhibited, it is possible to control the control amount in a more finely-grained manner and improve the resolution and accuracy of the control.

On the other hand, when the plant is in the control region in which the nonlinearities are hardly exhibited, by selecting the first control input before the modulation, as the control input, it is possible to cause the control amount to converge to the target value while avoiding a state in which the amplitude of the control input is reflected on the control amount in a noise-like fashion, which can be caused when the second control input having such an amplitude as can compensate for the nonlinearities in the control region in which the fluid circuit system exhibits the nonlinearities is selected, under the conditions of the sensitivity of the control amount to the control input being reduced. As a result, it is possible to control the control amount in a more finely-grained manner compared with the case of the second control input being selected as the control input in the control region in which the plant hardly exhibits the nonlinearities, to thereby improve the resolution and accuracy of the control. As described above, both in the control region in which the plant temporarily very strongly exhibits the nonlinearities and the control region in which the plant hardly exhibits the nonlinearities, it is possible to improve the resolution and accuracy of the control (it should be noted that the term "calculate" used in the present specification as in "calculating a first control input" and "calculates a second control input" is not limited to computation by a program but includes generating electric signals indicative these, by hardware.

Preferably, the second control input-calculating means comprises central value-setting means for setting a central value as a center of an amplitude of the second control input according to the first control input, and amplitude setting means for setting the amplitude of the second control input to a value smaller than a range between a maximum value and a minimum value that the first control input can assume.

As described above, in the case of the plant including a control region in which nonlinearities are temporarily very strongly exhibited, and a control region in which the nonlinearities are hardly exhibited, when the plant is in the control region where the nonlinearities are exhibited, there can occur a state in which the control amount largely deviates from the target value, and hence the range between the maximum value and the minimum value that the first control input can assume becomes considerably large. Therefore, if the amplitude of the second control input is set to a value large enough to cover the range between the maximum value and the minimum value that the first control input can assume, the large amplitude of the second control input is reflected on the control amount in a noise-like fashion, which can degrade the resolution and accuracy of the control. In contrast, with the configuration of the preferred embodiment, the central value as a center of the amplitude of the second control input is set according to the first control input, and hence even if the range between the maximum value and the minimum value that the first control input can assume is large, only by setting the amplitude of the second control input to such a value as can cover the first control input at the control timing, which is smaller than a value for covering the entire range of the first control input, it is possible to compensate for the nonlinearities of the plant while securing the capability of the first control input for converging control amount to the target value. Thus, the strong nonlinearities of the plant can be properly compensated for while setting the amplitude of the second control input to a smaller value than when the entire range of the first control input is covered, whereby it is possible to further improve the resolution and accuracy of the control.

Preferably, the predetermined control algorithm is an algorithm to which is applied a target value filter-type two-degree-of-freedom control algorithm as a combination of a predetermined target value filter-type algorithm and a predetermined response-specifying control algorithm.

With the configuration of this preferred embodiment, the first control input is calculated with an algorithm to which is applied the target value filter-type two-degree-of-freedom control algorithm as a combination of a predetermined target value filter-type algorithm and a predetermined response-specifying control algorithm. Therefore, through the use of the first control input, the target value filter-type algorithm makes it possible to set the converging speed of the control amount to the target value to a proper value, and separately therefrom, the predetermined response-specifying control algorithm makes it possible to properly set the converging behavior of the control amount to the target value. In short, in the calculation of the first control input, the converging behavior of the control amount to the target value and the converging speed at which the deviation between the control amount and the control input converges to a value of 0 can be properly set independently of each other. The use of the first control input thus calculated makes it possible to improve both the converging behavior of the control amount to the target value and the converging speed at which the difference between the control amount and the target value converges to a value of 0, compared with the case in which the first control input is calculated with a general feedback control algorithm. As a result, it is possible to further improve the control accuracy.

Preferably, the predetermined modulation algorithm is one of a $\Delta\Sigma$ modulation algorithm, a $\Sigma\Delta$ modulation algorithm, and a $\Delta$ modulation algorithm.

With the configuration of this preferred embodiment, the second control input is calculated by modulating the first control input with an algorithm to which is applied one of the $\Delta\Sigma$ modulation algorithm, the $\Sigma\Delta$ modulation algorithm, and the $\Delta$ modulation algorithm. In this case, all of the $\Delta\Sigma$ modulation algorithm, the $\Sigma\Delta$ modulation algorithm, and the $\Delta$ modulation algorithm have a characteristic that as the value input to these algorithm becomes closer to a value of 0, the inverting frequency of the value calculated with any of these algorithm becomes higher. On the other hand, the first control input is a value for controlling the control amount such that the control amount is caused to converge to the target value, and hence the first control input is less changed as the control amount becomes closer to the target value. Therefore, in the algorithm to which is applied one of the $\Delta\Sigma$ modulation algorithm, the $\Sigma\Delta$ modulation algorithm, and the $\Delta$ modulation algorithm, by configuring the algorithm such that if the first control input ceases to be changed, the value input to the one of them becomes closer to a value of 0, it is possible to calculate the control input such that the inventing frequency of the second control input becomes higher as the control amount becomes closer to the target value. As a result, compared with the case where the second control input is calculated using PWM or dithering in which the inverting frequency is fixed, it is possible to improve the convergence of the control amount to the target value.

Preferably, the controller further comprises disturbance estimate-calculating means for calculating a disturbance estimate for compensating for a disturbance which the plant receives, based on the control amount and the first control input, with a predetermined estimation algorithm, and the first control input-calculating means calculates the first control input based on the calculated disturbance estimate with the predetermined control algorithm.

When the control algorithm using an integral value of the difference between the control amount and the target value for disturbance compensation is used as the algorithm for calculating the first control input, there is a fear that when the plant receives a disturbance, due to the disturbance compensation effect of the integral value, the difference between the control amount and the target value exhibits an oscillatory swing-back behavior, or temporarily becomes too large. In contrast, with the configuration of this preferred embodiment, the disturbance estimate for compensating for the disturbance received by the plant is calculated based on the control amount and the first control input with a predetermined estimation algorithm, and the first control input is calculated based on the disturbance estimate with a predetermined control algorithm. Therefore, when the plant receives a disturbance, differently from the case where the integral value of the difference between the control amount and the target value is used, it is possible to compensate for the influence of the disturbance while preventing the difference between the control amount and the target value from exhibiting the oscillatory swing-back behavior or becoming too large, thereby making it possible to cause the control amount to speedily converge to the target value.

To attain the above object, in a second aspect of the present invention, there is provided a controller that controls fluid pressure of a fluid circuit system in which the fluid pressure is increased and decreased by opening and closing of a pressure increasing passage and a pressure decreasing passage, comprising a valve that opens and closes the pressure increasing passage and the pressure decreasing passage, an actuator that actuates the valve, fluid pressure-detecting means for detecting the fluid pressure, target value-setting means for setting a target value as a target of the fluid pressure, first control input-calculating means for calculating a first control input for controlling the detected fluid pressure such that the detected fluid pressure is caused to converge to the set target value, with a predetermined control algorithm, second control input-calculating means for calculating a second control input by modulating the first control input with an algorithm to which is applied a predetermined modulation algorithm, and control input-selecting means for selecting one of the first control input and the second control input as the control input to the actuator, depending on conditions of the fluid circuit system.

With the configuration of this controller, the first control input for controlling the control amount such that the fluid pressure is caused to converge to the target value is calculated with a predetermined control algorithm, and the second control input is calculated by modulating the first control input with an algorithm to which is applied a predetermined modulation algorithm. Further, depending on the conditions of the fluid circuit system, one of the first control input and the second control input is selected. On the other hand, in the fluid circuit system in which the fluid pressure increases and decreases due to opening and closing of the pressure increasing passage and the pressure decreasing passage, if the control pressure is controlled by actuating the valve for opening and closing the pressure increasing passage and the pressure decreasing passage, there are cases in which there occur a control region in which nonlinearities are temporarily very strongly exhibited, and a control region in which the nonlinearities are hardly exhibited. Therefore, when the fluid circuit system is in the control region in which the nonlinearities are exhibited, the second control input is selected as the control input, whereby it is possible to cause the fluid pressure to converge to the target value while compensating for the strong nonlinearities. As a result, compared with the case of selecting the first control input as the control input in the control region in which the nonlinearities are exhibited, it is possible to improve the resolution and accuracy of the fluid pressure control.

On the other hand, when the fluid circuit system is in the control region in which the nonlinearities are hardly exhibited, by selecting the first control input before the modulation, as the control input, it is possible to cause the fluid pressure to converge to the target value while avoiding a state in which the amplitude of the control input is reflected on the fluid pressure in a noise-like fashion, which can be caused when the second control input having such an amplitude as can compensate for the nonlinearities in the control region in which the fluid circuit system exhibits the nonlinearities is selected. As a result, it is possible to improve the resolution and accuracy of the fluid pressure control compared with the case of the second control input being selected as the control input in the control region in which the plant hardly exhibits the nonlinearities. As described above, both in the control region in which the plant temporarily very strongly exhibits the nonlinearities and the control region in which the plant hardly exhibits the nonlinearities, it is possible to improve the resolution and accuracy of the control.

Preferably, the second control input-calculating means comprises central value-setting means for setting a central value as a center of an amplitude of the second control input according to the first control input, and amplitude setting means for setting the amplitude of the second control input to a value smaller than a range between a maximum value and a minimum value that the first control input can assume.

As described above, when controlling the fluid pressure in the fluid circuit system including a control region in which nonlinearities are temporarily very strongly exhibited, and a control region in which the nonlinearities are hardly exhibited, if the fuel circuit system is in the control region where the nonlinearities are exhibited, the second control input is selected as the control input, if the amplitude of the second control input is set to a value large enough to cover the range between the maximum value and the minimum value that the first control input can assume, the large amplitude of the second control input is reflected on the fluid pressure in a noise-like fashion, which can degrade the resolution and accuracy of the fluid pressure control. In contrast, with the configuration of this preferred embodiment, the central value as a center of the amplitude of the second control input is set according to the first control input, and hence even if the range between the maximum value and the minimum value that the first control input can assume is large, only by setting the amplitude of the second control input to such a value as can cover the first control input at the control timing, which is smaller than a value for covering the entire range of the first control input, it is possible to compensate for the nonlinearities of the fluid circuit system while securing the capability of the first control input for converging fluid pressure to the target value. Thus, in the control region in which the fluid circuit system temporarily very strongly exhibits the nonlinearities, the strong nonlinearities can be properly compensated for while setting the amplitude of the second control input to a smaller value, whereby it is possible to further improve the resolution and accuracy of the fluid pressure control.

Preferably, the predetermined control algorithm is an algorithm to which is applied a target value filter-type two-degree-of-freedom control algorithm as a combination of a predetermined target value filter-type algorithm and a predetermined response-specifying control algorithm.

With the configuration of this preferred embodiment, the first control input is calculated with an algorithm to which is applied the target value filter-type two-degree-of-freedom control algorithm as a combination of a predetermined target value filter-type algorithm and a predetermined response-specifying control algorithm. Therefore, through the use of the first control input, the target value filter-type algorithm makes it possible to set the converging speed of the fluid pressure to the target value to a proper value, and separately therefrom, the predetermined response-specifying control algorithm makes it possible to properly set the converging behavior of the fluid pressure to the target value. In short, in the calculation of the first control input, the converging behavior and the converging speed of the fluid pressure to the target value can be properly set independently of each other. The use of the first control input thus calculated makes it possible to improve both the converging behavior of the fluid pressure to the target value and the converging speed, compared with the case in which the first control input is calculated with a general feedback control algorithm. As a result, it is possible to further improve the control accuracy.

Preferably, the predetermined modulation algorithm is one of a $\Delta\Sigma$ modulation algorithm, a $\Sigma\Delta$ modulation algorithm, and a $\Delta$ modulation algorithm.

With the configuration of this preferred embodiment, the second control input is calculated by modulating the first control input with an algorithm to which is applied one of the ΔΣ modulation algorithm, the ΣΔ modulation algorithm, and the Δ modulation algorithm. In this case, all of the ΔΣ modulation algorithm, the ΣΔ modulation algorithm, and the Δ modulation algorithm have a characteristic that as the value input to these algorithms becomes closer to a value of 0, the inverting frequency of the value calculated with any of these algorithm becomes higher. On the other hand, the first control input is a value for controlling the fluid pressure such that the fluid pressure is caused to converge to the target value, and hence the first control input is less changed as the fluid pressure is closer to the target value. Therefore, in the algorithm using one of the ΔΣ modulation algorithm, the ΣΔ modulation algorithm, and the Δ modulation algorithm, by configuring the algorithm such that if the first control input ceases to be changed, the value input to the one of the ΔΣ modulation algorithm, the ΣΔ modulation algorithm, and the Δ modulation algorithm becomes closer to a value of 0, it is possible to calculate the control input such that the inventing frequency of the second control input becomes higher as the fluid pressure becomes closer to the target value. As a result, compared with the case where the second control input is calculated using PWM or dithering in which the inverting frequency is fixed, it is possible to improve the convergence of the fluid pressure to the target value.

Preferably, the controller further comprises disturbance estimate-calculating means for calculating a disturbance estimate for compensating for a disturbance which the fluid circuit system receives, based on the fluid pressure and the first control input, with a predetermined estimation algorithm, and the first control input-calculating means calculates the first control input based on the calculated disturbance estimate with the predetermined control algorithm.

When the control algorithm using an integral value of the difference between the fluid pressure for disturbance compensation and the target value is used as the algorithm for calculating the first control input, there is a fear that when the fluid circuit system receives a disturbance, due to the disturbance compensation effect of the integral value, the difference between the fluid pressure and the target value exhibits an oscillatory swing-back behavior, or temporarily becomes too large. In contrast, with the configuration of this preferred embodiment, the disturbance estimate for compensating for the disturbance received by the fluid circuit system is calculated based on the fluid pressure and the first control input with a predetermined estimation algorithm, and the first control input is calculated based on the disturbance estimate with a predetermined control algorithm. Therefore, when the fluid circuit system receives a disturbance, differently from the case where the integral value of the difference between the fluid pressure and the target value is used, it is possible to compensate for the influence of the disturbance while preventing the difference between the fluid pressure and the target value from exhibiting the oscillatory swing-back behavior or becoming too large, thereby causing the fluid pressure to speedily converge to the target value.

Preferably, the fluid circuit system is a fuel supply system that supplies fuel to an internal combustion engine, the fluid pressure being a fuel pressure in the fuel supply system, and the control input-selecting means selects the second control input as the control input, when the fuel pressure is controlled to be deceased.

In the fuel supply system, when the fuel pressure is controlled to be decreased due to a higher value thereof than the target value, if the pressure decreasing passage is opened by the valve, the fuel at high pressure is suddenly released, so that even if the opening degree of the valve is set to a smaller value, the fuel pressure tends to temporarily largely undershoot the target value. In other words, the nonlinearities become temporarily very strong. Therefore, when the fuel pressure is controlled to be decreased, if the first control input is selected as the control input, such strong nonlinearities cannot be compensated for, which lowers the resolution and accuracy of the fuel pressure control. In contrast, with the configuration of the preferred embodiment, when the fuel pressure is controlled to be decreased, the second control input is selected, which makes it possible to compensate for the strong nonlinearities and avoid the occurrence of large undershooting. As a result, it is possible to improve the resolution and accuracy of the fuel pressure control.

Preferably, the fluid circuit system is a fuel supply system that supplies fuel to an internal combustion engine, the fluid pressure being a fuel pressure in the fuel supply system, and the control input-selecting means selects the second control input as the control input, when fuel supply from the fuel supply system to the engine is interrupted.

As described above, the fuel supply system tends to exhibit strong nonlinearities when the fuel pressure is controlled to be decreased, causing the fuel pressure to temporarily largely undershoot the target value. Therefore, if the first control input is selected as the control input when the fuel supply from the fuel supply system to the internal combustion engine is interrupted and the target value is set to a substantially fixed value, such strong nonlinearities cannot be compensated for, causing the undershooting during the pressure decreasing control. For recovery from this, the pressure increasing control is consecutively executed. In other words, the pressure increasing control and the pressure decreasing control are repeatedly executed, which results in a state where the fuel pressure does not converge to the target value. As a result, when the supply of fuel to the engine is resumed, it is impossible to supply the fuel at suitable fuel pressure, which degrades the accuracy of fuel supply control, causing degradation of the accuracy of air fuel ratio control. In contrast, with the configuration of this preferred embodiment, when the fuel supply to the engine from the fuel supply system is interrupted, the second control input is selected, which makes it possible to compensate fro the strong nonlinearities and avoid the occurrence of large undershooting, whereby the fuel pressure can be caused to converge to the target value. As a result, when the supply of the fuel to the engine is resumed, it is possible to supply the fuel at suitable fuel pressure, thereby making it possible to improve the accuracy of the air-fuel ratio control.

The above and other objects, features, and advantages of the present invention will become more apparent from the following detailed description taken in conjunction with the accompanying drawings.

BRIEF DESCRIPTION OF THE DRAWINGS

FIG. 3 is a schematic block diagram of the controller;

FIG. 6 is a diagram showing an example of a map for use in the calculation of a normal operation value Pf_map;

DETAILED DESCRIPTION OF PREFERRED EMBODIMENTS

Figure 1:
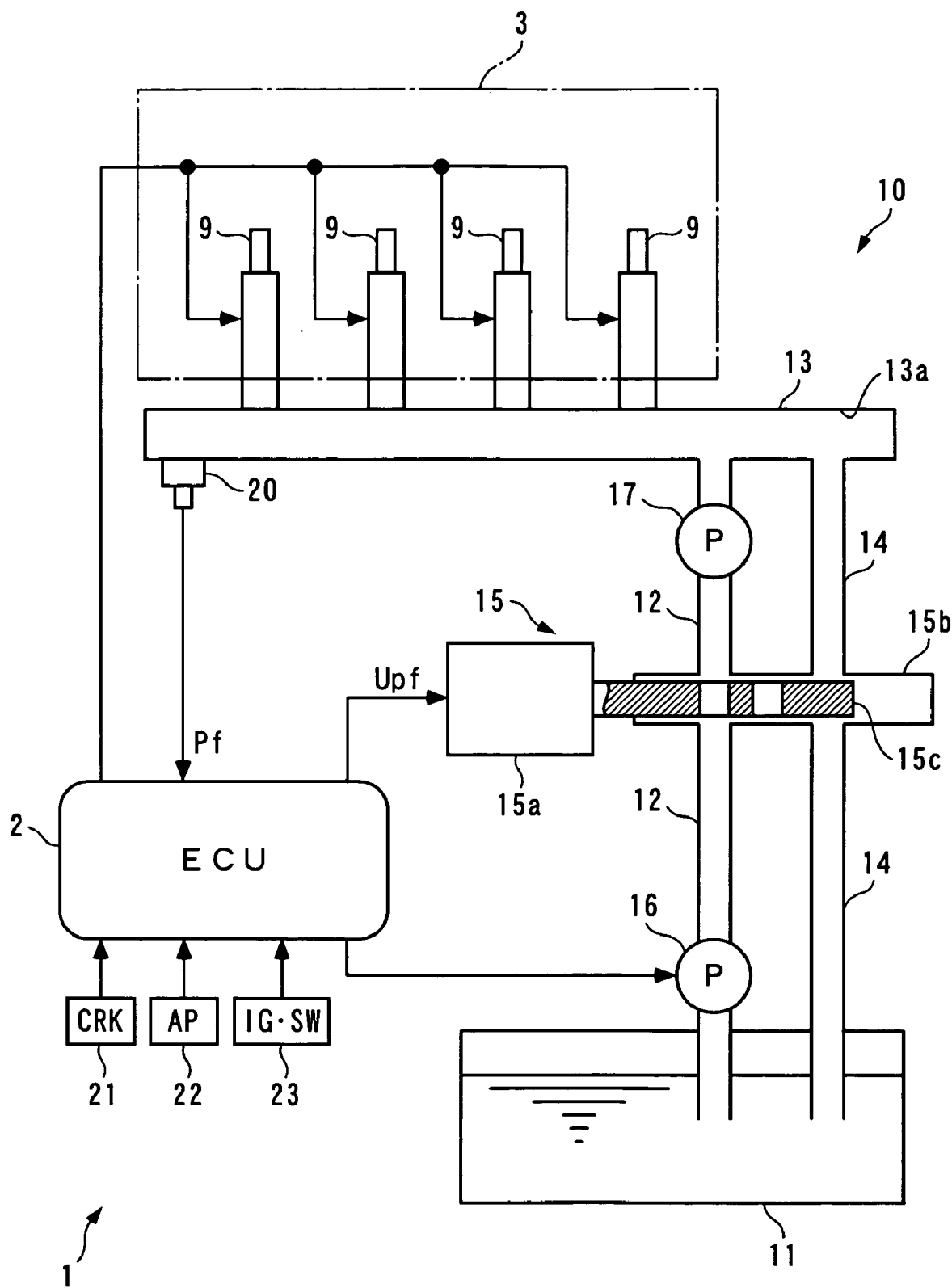
FIG. 1 is a schematic diagram of a controller according to an embodiment of the present invention and a fuel supply system to which is applied the controller.

The present invention will now be described in detail with reference to the drawings showing preferred embodiments thereof. Referring first to FIG. 1, there is schematically shown the arrangement of a fuel supply system 10 to which is applied a controller 1 according to an embodiment of the present invention. As shown in FIG. 1, the controller 1 includes an ECU 2 which carries out control processes, such as a fuel pressure control process, described in detail hereinafter.

The fuel supply system 10 is applied to a straight type four-cylinder internal combustion engine 3 (hereinafter simply referred to as "the engine 3"), and supplies high-pressure fuel (gasoline) to four fuel injection valves 9 during operation of the engine 3. The fuel supply system 10 includes a fuel tank 11, a delivery pipe 13 connected to the fuel tank 11 via a fuel supply passage 12 and a fuel return passage 14, and a solenoid control valve 15 for opening and closing the fuel supply passage 12 and the fuel return passage 14. It should be note that in the present embodiment, the fuel supply system 10 corresponds to a fluid circuit system and a fuel supply system, and the fuel supply passage 12 and the fuel return passage 14 corresponds to a pressure increasing passage and a pressure decreasing passage, respectively.

The fuel supply passage 12 is provided with a low-pressure pump 16 and a high-pressure pump 17. The low-pressure pump 16 is an electric pump whose operation is controlled by the ECU 2. The low-pressure pump 16 is constantly controlled during operation of the engine 3 to pressurize fuel within the fuel tank 11 to a predetermined pressure (e.g. 0.5 MPa) and deliver the pressurized fuel toward the high-pressure pump 17.

The high-pressure pump 17 is of a volume type and is connected to a crankshaft, not shown. The high-pressure pump 17 further pressurizes the fuel from the low-pressure pump 16 in accordance with rotation of the crankshaft, and delivers the fuel toward the delivery pipe 13.

The delivery pipe 13 has an inner space formed as a fuel chamber 13a for storing the fuel from the high-pressure pump 17 in a high-pressure state. The aforementioned four fuel injection valves 9 and a fuel pressure sensor 20 are mounted to the delivery pipe 13, and when each fuel injection valve 9 is opened, the fuel within the fuel chamber 13a is injected into a combustion chamber, not shown, of the engine 3.

The fuel pressure sensor 20 is electrically connected to the ECU 2, and detects a fuel pressure Pf within the fuel chamber 13a to output an electric signal indicative of the sensed fuel pressure Pf to the ECU 2. It should be noted that in the present embodiment, the fuel pressure sensor 20 corresponds to control amount-detecting means and fluid pressure-detecting means, and the fuel pressure Pf corresponds to a control amount and fluid pressure.

Figure 2A:
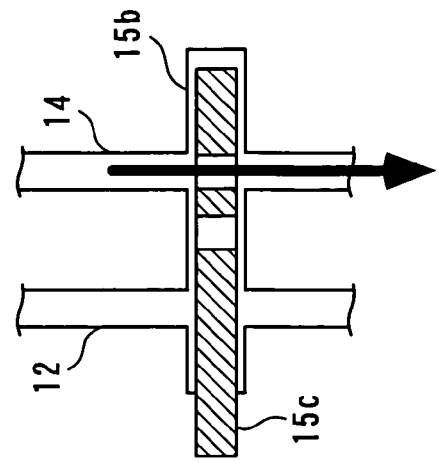
FIGS. 2A to 2C are views showing operating states of a spool valve mechanism.
Figure 2B:
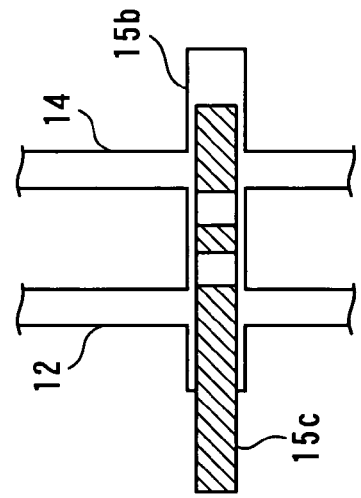
Figure 2C:
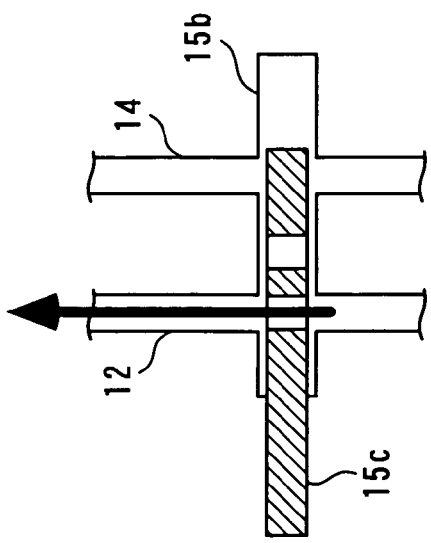
Figure 4:
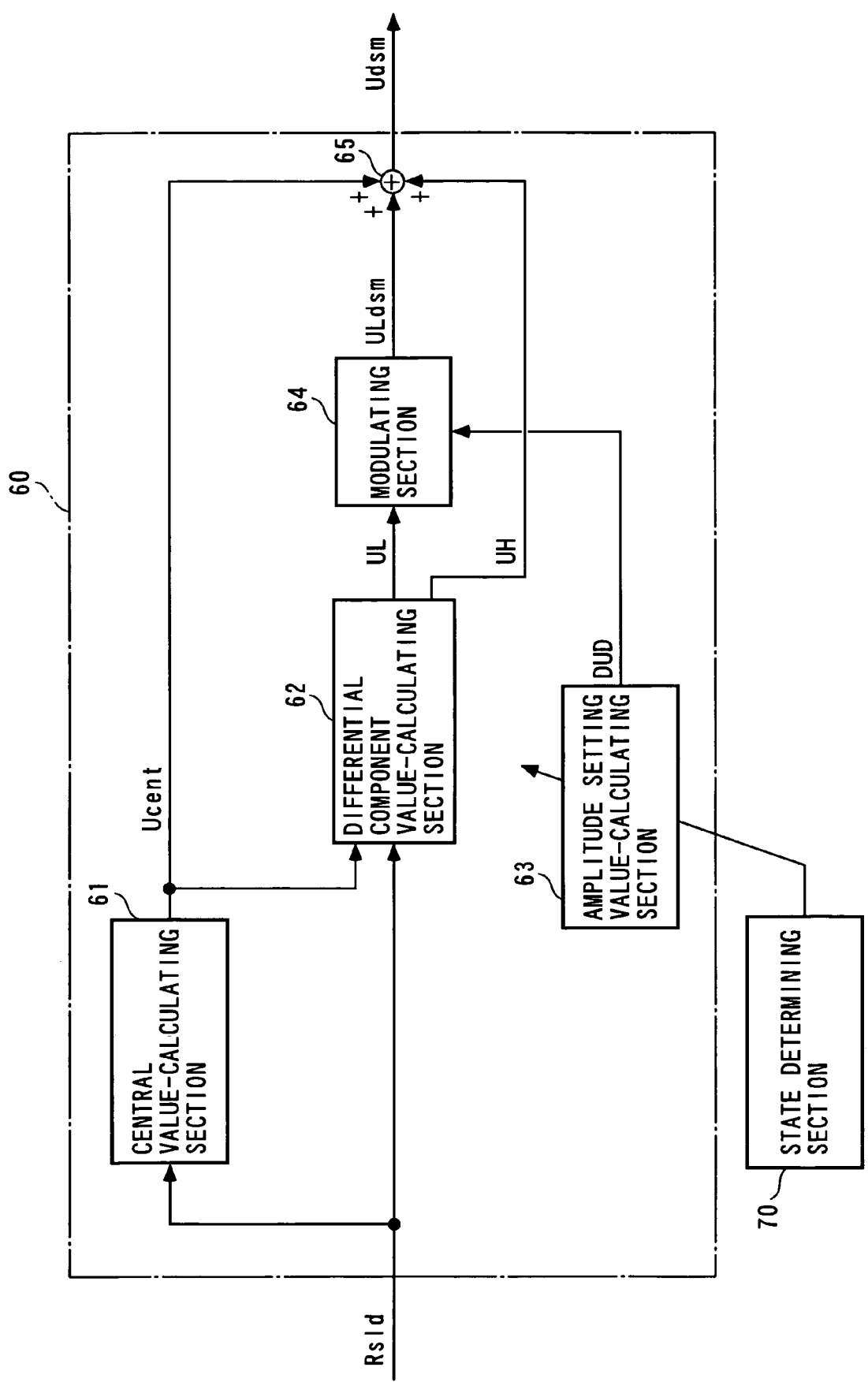
FIG. 4 is a schematic block diagram of a DSM controller.

The solenoid control valve 15 is of a type formed by combining a solenoid actuator 15a and a spool valve mechanism 15b, and is connected to the ECU 2. The solenoid actuator 15a is controlled by a control input Upf, described in detail hereinafter, from the ECU 2 to drive a valve element 15c of the spool valve mechanism 15b such that the valve element 15c is moved between a pressure increasing position shown in FIG. 2A, a pressure holding position shown in FIG. 2B, and a pressure decreasing position shown in FIG. 2C.

In the fuel supply system 10, when the solenoid control valve 15 is controlled to the pressure increasing position, the valve element 15c opens the fuel supply passage 12 and closes the fuel return passage 14, whereby the fuel pressure Pf is increased. On the other hand, when the solenoid control valve 15 is controlled to the pressure decreasing position, the valve element 15c closes the fuel supply passage 12 and opens the fuel return passage 14 whereby the fuel pressure Pf is decreased. Further, when the solenoid control valve 15 is controlled to the pressure holding position, the fuel supply passage 12 and the fuel return passage 14 are both closed by the valve element 15c whereby the fuel pressure Pf is held at the current value.

With the above described arrangement, in the fuel supply system 10, the position of the valve element 15c of the solenoid control valve 15 is controlled by the ECU 2, whereby the fuel pressure Pf is controlled as described hereinafter. In this case, when the pressure increasing control is performed, since the inside of the fuel chamber 13a is at high pressure, the fuel pressure Pf varies toward a target fuel pressure Pf_cmd in a relatively stable manner. That is, the fuel pressure Pf can be controlled with a high resolution.

On the other, when the pressure decreasing control is performed, even if the opening of the fuel return passage 14 is controlled to be small by the solenoid control valve 15, due to a structural characteristic in which the pressure in the fuel return passage 14 at a location downstream of the solenoid control valve 15 is far lower than pressure in the fuel chamber 13a and a structural characteristic of the spool valve mechanism 15b, at the instant the fuel return passage 14 is opened, the fuel pressure Pf temporarily undershoots the target fuel pressure Pf_cmd. In other words, the nonlinearities under the fuel pressure control temporarily becomes very strong, causing degradation of the resolution of fuel pressure control. As described above, when the fuel pressure Pf of the fuel supply system 10 is controlled, due to the structural characteristics thereof, there exist a control region in which nonlinearities are temporarily very strongly exhibited and a control region in which the nonlinearities are hardly exhibited.

Also connected to the ECU 2 are a crank angle sensor 21, an accelerator pedal opening sensor 22, and an ignition switch sensor (hereinafter referred to as "the IG·SW") 23. The crank angle sensor 21 is comprised of a magnet rotor and an MRE pickup, and delivers a CRK signal, which is a pulse signal, to the ECU 2 along with rotation of the crankshaft of the engine 3. Each pulse of the CRK signal is generated whenever the crankshaft rotates through a predetermined crank angle (e.g. 10°), and the ECU 2 calculates rotational speed NE of the engine 3 (hereinafter referred to as "the engine speed NE") based on the CRK signal.

Further, the accelerator pedal opening sensor 22 detects an amount of operation, i.e. a stepped-on amount (hereinafter referred to as "the accelerator pedal opening") AP of an accelerator pedal, not shown, of a vehicle on which the engine 3 is installed, and delivers a signal indicative of the detected accelerator pedal opening AP to the ECU 2. The IG·SW 23 is turned on and off by operation of an ignition key, not shown, and delivers a signal indicative of its ON/OFF state to the ECU 2.

The ECU 2 is implemented by a microcomputer including a CPU, a RAM, a ROM, and an I/O interface, none of which are shown. The ECU 2 controls the fuel pressure Pf via the solenoid valve 15 based on the detection signals delivered from the above-mentioned sensors 20 to 22 and the output signal from the IG·SW 23. Further, the ECU 2 carries out fuel injection control via the fuel injection valves 9, and performs ignition timing control via an ignition plug, not shown.

It should be noted that in the present embodiment, the ECU 2 corresponds to target value-setting means, first control input-calculating means, second control input-calculating means, control input-selecting means, central value-setting means, amplitude setting means, and disturbance estimate-calculating means.

Next, the controller 1 according to the present embodiment will be described with reference to FIG. 3. As shown in FIG. 3, the controller 1 is configured to control the fuel pressure Pf as the control amount by inputting the control input Upf to the plant 4. The plant 4 corresponds to a system including the fuel supply system 10.

As shown in FIG. 3, the controller 1 is comprised of a target fuel pressure-calculating section 30, a two-degree-of-freedom response-specifying controller 40, an adaptive disturbance observer 50, a DSM controller 60, a state determining section 70, and a control input-selecting section 80, which are implemented by the ECU 2. In the present embodiment, the target fuel pressure-calculating section 30 corresponds to the target value-setting means, the two-degree-of-freedom response-specifying controller 40 to the first control input-calculating means, the adaptive disturbance observer 50 to the disturbance estimate-calculating means, the DSM controller 60 to the second control input-calculating means, and the control input-selecting section 80 to the control input-selecting means.

First, the target fuel pressure-calculating section 30 calculates the target fuel pressure Pf_cmd (target value) e.g. by map retrieval, described hereinafter.

Also, the two-degree-of-freedom response-specifying controller 40 calculates the first control input Rsld based on the target fuel pressure Pf_cmd, the fuel pressure Pf, and the like, with a target value filter-type two-degree-of-freedom response-specifying control algorithm expressed by the following equations (1) to (6):

$$Pf\_cmd\_f(k) = -R \cdot Pf\_cmd\_f(k-1) + (1+R) \cdot Pf\_cmd(k) \quad (1)$$

$$Rsld(k) = Req(k) + Rrch(k) \quad (2)$$

$$Req(k) = \frac{1}{b1}\begin{Bmatrix} (1-a1-S) \cdot Pf(k) + (S-a2) \cdot \\ Pf(k-1) - b2 \cdot Rsld(k-1) - \\ c1(k) + Pf\_cmd\_f(k) + (S-1) \cdot \\ Pf\_cmd\_f(k-1) - S \cdot Pf\_cmd\_f(k-2) \end{Bmatrix} \quad (3)$$

$$Rrch(k) = -\frac{Krch}{b1}\sigma(k) \quad (4)$$

$$\sigma(k) = Epf(k) + S \cdot Epf(k-1) \quad (5)$$

$$Epf(k) = Pf(k) - Pf\_cmd\_f(k-1) \quad (6)$$

In these equations (1) to (6), each piece of discrete data with the symbol (k) is data sampled or calculated in timing synchronous with a predetermined control period ΔT, referred to hereinafter, and the symbol k represents a position in the sequence of sampling or calculating cycles. For example, the symbol k indicates that a value therewith is a value sampled or calculated at the current control period, and the symbol k-1 indicates that a value therewith is a value sampled or calculated at the immediately preceding control period. This applies to discrete data in equations described hereinafter. It should be noted that in the following, the symbol (k) and the like are omitted when deemed appropriate.

In the present control algorithm, first, a filtered value Pf_cmd_f of the target fuel pressure is calculated with a first-order lag low-pass filter algorithm expressed by the equation (1). In the equation (1), the symbol R represents a target value filter-setting parameter. The target value filter-setting parameter is set to a value satisfying the relationship of −1<R<0.

Then, the first control input Rsld is calculated with a response-specifying control algorithm (a sliding mode control algorithm or a back stepping control algorithm) expressed by the equations (2) to (6). More specifically, as shown in the equation (2), the first control input Rsld is calculated as the sum of an equivalent input Req and a reaching law input Rrch. The equivalent input Req is calculated using the equation (3). In the equation (3), symbols a1, a2, b1, and b2 represent model parameters of a controlled object model, referred to hereinafter. The model parameters are set to predetermined fixed values, respectively. Further, the symbol c1 in the equation (3) represents a disturbance estimate. The disturbance estimate c1 is calculated by the adaptive disturbance observer 50 as described hereinafter. The symbol S in the equation (3) represents a switching function-setting parameter. The switching function-setting parameter S is set to a value satisfying the relationship of −1<R<S<0.

The reaching law input Rrch is calculated using the equation (4). In the equation (4), the symbol Krch represents a predetermined reaching law gain, and the symbol σ represents a switching function. The symbol Epf in the equation (5) represents a follow-up error, which is calculated by the equation (6).

According to the control algorithm of the two-degree-of-freedom response-specifying controller 40, the follow-up speed of the fuel pressure Pf to the target fuel pressure Pf_cmd is set with a target value filter-type algorithm, and at the same time, the follow-up behavior of the fuel pressure to the target fuel pressure Pf_cmd is set with a sliding mode control algorithm. Therefore, it is possible to set the follow-up speed and the follow-up behavior separately, and also set both the follow-up speed and the follow-up behavior to respective higher levels than when the usual feedback control algorithm is employed. That is, the first control input Rsld is calculated as a value having an excellent control characteristic in that it is capable of maintaining both the follow-up speed of the fuel pressure Pf to the target fuel pressure Pf_cmd and the follow-up behavior thereof at high levels, when the fuel supply system 10 is in the control region in which it hardly exhibits the nonlinearities.

The equations (1) to (6) are derived as follows: Assuming that the plant 4 to be controlled is defined as a system to which the first control input Rsld is inputted as the control input, using the fuel pressure Pf as the control amount, and in which the disturbance estimate c1 represents a disturbance input, and this system is modeled into a discrete-time system model, the following equation (7) is obtained:

$$Pf(k+1)=a1 \cdot Pf(k)+a2 \cdot Pf(k-1)+b1 \cdot Rsld(k)+b2Rsld(k-1)+c1 \quad (7)$$

When a target value filter-type two-degree-of-freedom response-specifying control theory is used based on the controlled object model obtained by discretizing the disturbance estimate c1 in the equation (7), such that the fuel pressure Pf converges to the target fuel pressure Pf_cmd, the equations (1) to (6) are derived.

Next, a description will be given of the adaptive disturbance observer 50. In the adaptive disturbance observer 50, the disturbance estimate c1 is calculated based on the fuel pressure Pf and the first control input Rsld, with the disturbance estimation algorithm expressed by the following equations (8) to (10):

$$c1(k) = c1(k-1) + \frac{Pdov}{1+Pdov} \cdot e\_dov(k) \quad (8)$$

$$e\_dov(k) = Pf(k) - Pf\_hat(k) \quad (9)$$

$$Pf\_hat(k) = a1 \cdot Pf(k-1) + a2 \cdot Pf(k-2) + b1 \cdot Rsld(k-1) + b2 \cdot Rsld(k-2) + c1(k-1) \quad (10)$$

In the equation (8), Pdof represent a predetermined identification gain, and e_dov represents an identification error calculated by the equation (9). Pf_hat in the equation (9) represents an identified value of the fuel pressure which is calculated by the equation (10).

Further, the state determining section 70 sets a F/C operation flag F_FC and a pressure decreasing control flag F_PDEC. The F/C operation flag F_FC indicates whether or not the conditions for F/C operation in which both the fuel injection and ignition of a mixture are stopped are satisfied. More specifically, the following F/C operation executing conditions (a) and (b) are both satisfied, the F/C operation flag is set to a value of 1, and otherwise set to 0.

(a) Engine speed NE is not lower than a predetermined value.

(b) Accelerator opening AP indicates a value representative of a non-stepped-on state of the accelerator pedal.

On the other hand, the pressure decreasing control flag F_PDEC indicates whether or not conditions for executing the pressure decreasing control are satisfied, and is set according to the results of comparison between the aforementioned difference Epf (=Pf(k)–Pf_cmd_f(k–1)) and a predetermined reference value EPF_TH (e.g. 0.05 MPa). More specifically, the pressure decreasing control flag F_PDEC is set to 1 when Epf>EPF_TH holds, and to 0 when Epf≦EPF_TH holds. These two flags F_FC and F_PDEC are used, as described hereinafter, when the DSM controller 60 determines an amplitude setting value DUD, and when the control input-selecting section 80 selects the control input Upf. Further, when setting the pressure decreasing control flag F_PDEC, the difference between the fuel pressure Pf(k) and the target fuel pressure Pf_cmd(k) may be compared with the reference value EPF_TH, in place of the difference between the fuel pressure Pf(k) and the target fuel pressure Pf_cmd(k).

Next, a description will be given of the DSM controller 60. The DSM controller 60 calculates the second control input Udsm by modulating the first control input Rsld, and is comprised of a central value calculating section 61, a differential component value-calculating section 62, an amplitude setting value-calculating section 63, a modulation section 64, and an adder 65.

This central value-calculating section 61 (central value-setting means) calculates the central value Ucent of the amplitude of the second control input Udsm with a non-linear algorithm based on rate limits expressed by the following equations (11) to (15):

$$Ucent(k)=Ucent(k-1)+Ducent(k) \quad (11)$$

$$Euc(k)=Rsld(k)-Ucent(k-1) \quad (12)$$

when $EPS \leq Euc(k)$ $Ducent(k)=EPS$ (13)

when $-EPS<Euc(k)<EPS$ $$Ducent(k)=Keu \cdot Euc(k) \quad (14)$$

when $-EPS \geq Euc(k)$ $Ducent(k)=-EPS$ (15)

Ducent in the above equation (11) represents an amount of change in the central value Ucent, and is calculated by performing a limiting process on the difference Euc defined by the equation (12) using –EPS as a lower limit and +EPS as an upper limit. The value EPS is set to a predetermined positive value. Further, Keu in the equation (14) represents a predetermined update gain, and is set to such a value as will satisfy the relationship of 0<Keu<<1.

As described above, the central value Ucent is calculated with a rate limit algorithm expressed by the equations (11) to (15), and hence is calculated as a value that will follow macroscopic changes in the first control input Rsld. Particularly, as shown in the equation (14), when –EPS<Euc<EPS holds, the amount of change Ducent is calculated as a value obtained by multiplying the difference Euc by the update gain Keu satisfying the relationship of 0<Keu<<1, and hence even when the first control input Rsld has suddenly changed, the central value Ucent is calculated as a value that gently follows the suddenly changed value of the first control input Rsld.

On the other hand, the differential component value-calculating section 62 calculates a small differential component value UL and a large differential component value UH based on the first control input Rsld and the central value Ucent, by the following equations (16) to (22).

$$Eu(k)=Rsld(k)-Ucent(k) \quad (16)$$

when $Eu(k) \geq DUL$ $UL(k)=DUL$ (17)

$$UH(k)=Eu(k)-DUL \quad (18)$$

when $-DUL(k)<Eu(k)<DUL$ $UL(k)=Eu(k)$ (19)

$$UH(k)=0 \quad (20)$$

when $Eu(k) \leq -DUL$ $UL(k)=-DUL$ (21)

$$UH(k)=Eu(k)+DUL \quad (22)$$

As shown in the above equations (16), (17), (19), and (21), the small differential component value UL is calculated by performing a limiting process on the difference Eu between the first control input and the central value, using –DUL as a lower limit value and +DUL as an upper limit value. This threshold value DUL is set to a predetermined positive value. Thus, the small differential component value UL is calculated as a value corresponding to a component when the first control input Rsld undergoes small changes within a range of the threshold value DUL with respect to the central value Ucent.

Further, as shown in the equations (18), (20), and (22), the large differential component value UH is calculated as a value of 0 when the absolute value of the difference between the first control input Rsld and the central value Ucent does not exceed the absolute value of the threshold value DUL, and when the former exceeds the latter, the large differential component value UH is calculated as a value corresponding to the excess amount. More specifically, when the first control input Rsld undergoes small changes, the large differential component value UT is calculated as a value of 0, whereas when the first control input Rsld changes largely due to large changes in the target fuel pressure Pf_cmd, in other words, when the quick responsiveness of the control is demanded, it is calculated as a value that will properly reflect such a value of the first control input Rsld on the second control input Udsm.

Further, the amplitude-setting calculating section 63 (amplitude setting means) calculates the amplitude setting value DUD based on the values of the two flags F_FC and F_PDEC set by the state determining section 70 described hereinabove, by the following equations (23) to (25). The amplitude setting value DUD determines the amplitude of a modulated value ULdsm, and more specifically, twofold of the amplitude setting value DUD, i.e. 2·DUD corresponds to the amplitude of the modulated value ULdsm.

$$\text{when } F\_FC=1 \; DUD(k)=DUDH \tag{23}$$

$$\text{when } F\_FC=0 \& F\_PDEC=1 \; DUD(k)=DUDL \tag{24}$$

$$\text{when } F\_FC=0 \& F\_PDEC=0 \; DUD(k)=DUDM \tag{25}$$

Now, DUDH, DUDL, and DUDM in the above equations (23) to (25) represent a predetermined F/C operation value, a pressure decreasing control value and a normal control value, respectively, and all these values are set to respective values not lower than the threshold value DUL. This is for the sake of securing the above-described excellent control characteristics of the first control input Rsld in the modulated value ULdsm, i.e. the second control input Udsm. That is, the characteristics of being capable of maintaining the follow-up speed of the fuel pressure Pf to the target fuel pressure Pf_cmd and the follow-up behavior at high levels, in the second control input Udsm.

Further, the two value DUDH and DUDL are set such that DUDH>DUDL holds. This is because during the F/C operation, the nonlinearities become stronger, and hence to more accurately execute the fuel injection control after resuming the fuel injection, it is necessary to perform the control with a higher resolution than when the pressure decreasing control is performed during the fuel injection operation. Therefore, by setting the amplitude of the modulated value ULdsm to a larger value, the resolution of the fuel pressure control is improved.

Further, the three values DUDH, DUDL, and DUDM are set such that the amplitude of the modulated value ULdsm, i.e. 2·DUD is smaller than the range between the maximum value and the minimum value that the first control input Rsld can assume.

On the other hand, the modulation section 64 calculates the modulated value ULdsm by modulating the small differential component value UL with an algorithm to which is applied the $\Delta\Sigma$ modulation algorithm expressed by the following equation (26) to (30):

$$\delta d(k)=UL(k)-ULdsm(k-1) \tag{26}$$

$$\sigma d(k)=\sigma d(k-1)+\delta d(k) \tag{27}$$

$$ULdsm(k)=Fn1(\sigma d(k)) \tag{28}$$

$$\text{when } \sigma d(k)\geq 0 \; Fn1(\sigma d(k))=DUD(k) \tag{29}$$

$$\text{when } \sigma d(k)<0 \; Fn1(\sigma d(k))=-DUD(k) \tag{30}$$

As shown in the equation (26), the difference $\delta$ d is calculated as the difference between the present value of the small differential component value UL and the immediately preceding value of the modulated value ULdsm. Further, in the equation (27), $\sigma$d represents an integral value of the difference $\delta$d. Further, in the equation (28), Fn1($\sigma$d) is a non-linear function defined by the equations (29) and (30) (it should be noted that definition may be such that when $\sigma$d=0, Fn1($\sigma$d)=0 holds.) As is apparent from the above equations (26) to (30), the modulated value ULdsm is calculated as a value that is repeatedly inverted between the minimum value −DUD and the maximum value +DUD.

As described above, the modulation section 64 calculates the modulated value ULdsm by modulating the small differential component value UL with an algorithm expressed by the above equations (26) to (30). Therefore, the when the first control input Rsld undergoes small changes, and hence there arises a small difference between the first control input Rsld and the central value Ucent, the modulated value ULdsm can be calculated as a value which is capable of compensating for the nonlinearities of the fuel supply system 10 while maintaining the above-described excellent control characteristics of the first control input Rsld. i.e. the characteristics of being capable of obtaining the follow-up speed of the fuel pressure Pf to the target fuel pressure Pf_cmd and the follow-up behavior at high levels.

On the other hand, the adder 65 calculates the second control input Udsm by the following equation (31):

$$Udsm(k)=ULdsm(k)+UH(k)+Ucent(k) \tag{31}$$

As described above, the DSM controller 60 calculates the second control input Udsm as a total sum of the modulated value ULdsm, the large differential component value UH, and the central value Ucent. In this case, the central value Ucent is calculated, as described above, as a value that will follow up macroscopic changes in the first control input Rsld, and the modulated value ULdsm is calculated, as described above, as a value that is capable of compensating for the nonlinearities of the fuel supply system 10 while maintaining the above-described excellent control characteristics of the first control input Rsld. i.e. the characteristic of being capable of obtaining the follow-up speed of the fuel pressure Pf to the target fuel pressure Pf_cmd and the follow-up behavior at high levels. Moreover, the large differential component value UH is calculated as a value for causing the behavior of the first control input Rsld to be properly reflected on the second control input Udsm and securing the quick responsiveness of the control, under circumstances in which the quick responsiveness of the control is demanded, e.g. when the first control input Rsld changes largely due to large changes in the target fuel pressure Pf_cmd.

Therefore, the second control input Udsm calculated as a total sum of the three values ULdsm, UH, and Ucent is calculated as a value which has the above-described excellent control characteristics of the first control input Rsld, i.e.

the characteristics of being capable of maintaining the follow-up speed of the fuel pressure Pf to the target fuel pressure Pf_cmd and the follow-up behavior at high levels, when the first control input Rsld undergoes small changes, and is at the same time capable of compensating for the nonlinearities of the fuel supply system 10 due to the fact that the modulated value ULdsm is modulated with the algorithm to which the ΔΣ modulation algorithm is applied.

In addition, under circumstances in which the quick responsiveness of the control is demanded, e.g. when the target fuel pressure Pf_cmd has suddenly largely changed, the second control input Udsm is calculated as a value which is capable securing the quick responsiveness of the control by the large differential component value UH. Further, the second control input Udsm is calculated as a value the central value Ucent of which follows macroscopic changes in the first control input Rsld, and hence the amplitude thereof, i.e. 2·DUD need not be set to a value large enough to cover the range between the maximum value and the minimum value which the first control input Rsld can assume during control, but only by setting the same to a smaller value than such a value, the second control input Udsm is calculated as value which is capable of compensating for the nonlinearities of the fuel supply system 10 while securing the above-described excellent control characteristics of the first control input Rsld.

It should be noted that the second control input Udsm may be calculated as a total sum of the modulated value ULdsm and the central value Ucent, by setting the large differential component value UH to a value of 0, depending on the necessity in control.

Further, the control input-selecting section 80 selects one of the first control input Rsld and the second control input Udsm as the control input Upf according to the two flags F_FC and F_PDEC set by the state determining section 70 described above. More specifically, when F_FC=1 holds, or when F_FC=0 and at the same time F_PDEC=1 hold, in other words, when the conditions for executing the F/C operation are satisfied, or when the conditions for executing the pressure decreasing control are satisfied during fuel supply operation, the first control input Rsld is selected as the control input Upf, whereas if F_FC=0 and at the same time F_PDEC=0 hold, the second control input Udsm is selected as the control input Upf.

Figure 5:
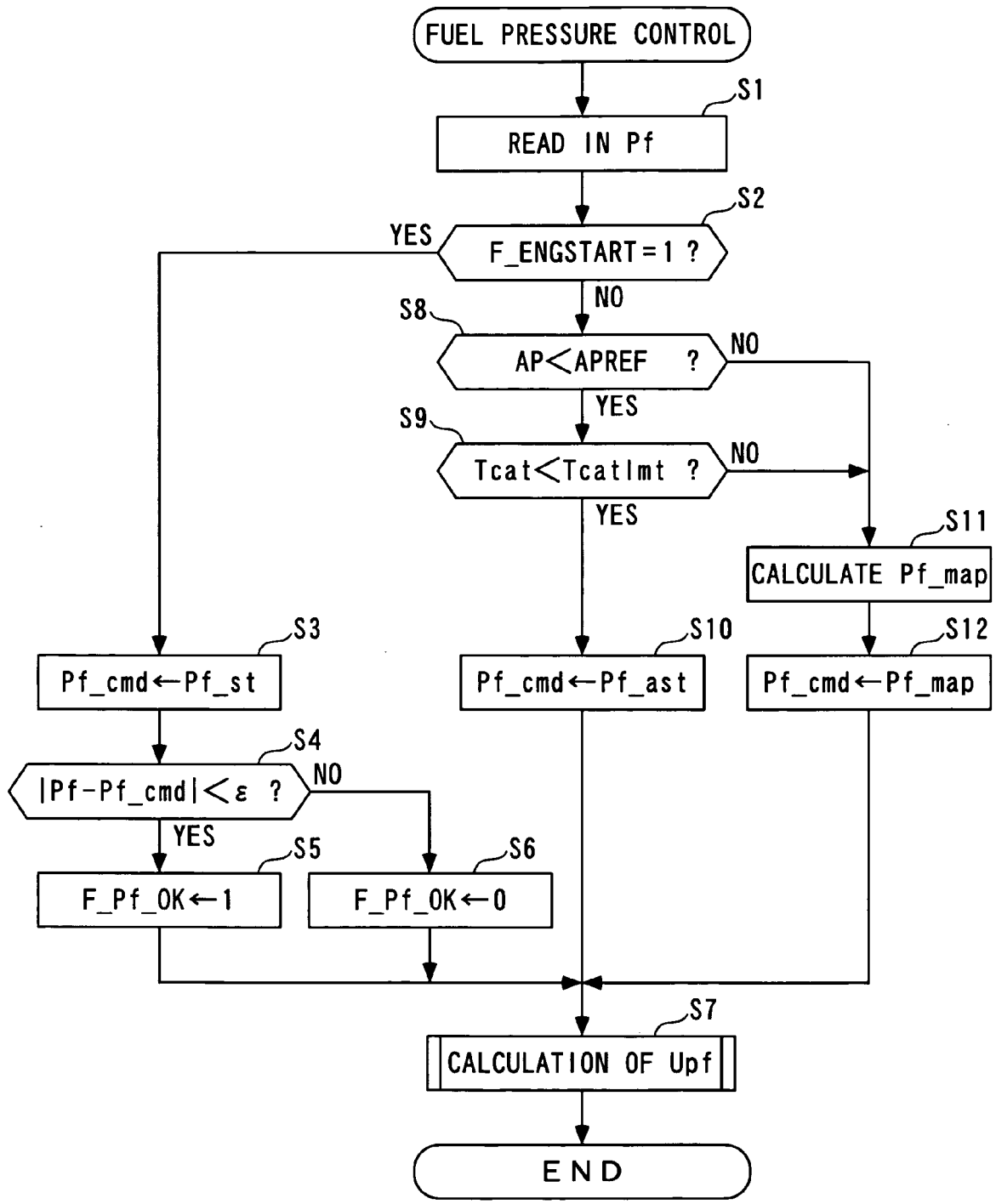
FIG. 5 is a flowchart showing a fuel pressure control process.

Next, the fuel pressure control process, which is executed by the ECU 2, will be described with reference to FIG. 5. The fuel pressure control process is carried out in a predetermined cycle ΔT (5 msec in the present embodiment) so as to calculate the control input Upf described above.

First, in a step 1 (shown as S1 in abbreviated form in FIG. 5; the following steps are also shown in abbreviated form), a value of the fuel pressure Pf stored in the RAM is read in. In other words, the value of the fuel pressure Pf is sampled. It should be noted that the value of the fuel pressure Pf is calculated by the moving average method, based on detection signal values from the fuel pressure sensor 20 in a fuel injection control process, not shown.

Then, the process proceeds to a step 2, wherein it is determined whether or not an engine start flag F_ENGSTART is equal to 1. The engine start flag F_ENGSTART is set by determining in a determination process, not shown, from the engine speed NE and the output signal of the IG·SW 23 whether or not engine start control, i.e. cranking of the engine is being executed. More specifically, when the engine start control is being executed, the engine start flag F_ENGSTART is set to 1, and otherwise set to 0.

If the answer to the question of the step 2 is affirmative (YES), i.e. if the engine start control is being executed, the program proceeds to a step 3, wherein the target fuel pressure Pf_cmd is set to a predetermined start-time value Pf_st. The predetermined start-time value Pf_st is set to a value (e.g. 2 MPa) that can ensure reduction of engine starting time and fuel spray suitable for engine start in a well balanced manner.

Then, the process proceeds to a step 4, wherein it is determined whether or not the absolute value |Pf-Pf_cmd| of the difference between the fuel pressure and the target fuel pressure is smaller than a predetermined reference value ε (e.g. 2 MPa). If the answer to this question is affirmative (YES), a fuel pressure maintaining flag F_Pf_OK is set to 1 in a step 5 so as to indicate that the fuel pressure Pf is maintained high enough to perform appropriate fuel injection.

On the other hand, if the answer to the question of the step 4 is negative (NO), the fuel pressure maintaining flag F_Pf_OK is set to 0 in a step 6. It should be noted that if F_Pf_OK=0 holds, fuel injection by the fuel injection valves 9 and ignition by the ignition plugs are stopped in the fuel injection control process and an ignition timing control process, respectively.

In a step 7 following the step 5 or 6, the control input Upf is calculated, described hereinafter, followed by terminating the present process.

On the other hand, if the answer to the question of the step 2 is negative (NO), i.e. if the engine start control is not being executed, the process proceeds to a step 8, wherein it is determined whether or not the accelerator pedal opening AP is smaller than a predetermined value APREF. The predetermined value APREF is used for determining whether the accelerator pedal is not being stepped on. The predetermined value APREF is set to a value (e.g. 1°) with reference to which it can be determined whether the accelerator pedal is not being stepped on.

If the answer to the question of the step 8 is affirmative (YES), i.e. if the accelerator pedal is not being stepped on, the process proceeds to a step 9, wherein it is determined whether or not the count Tcat of a catalyst warm-up timer is smaller than a predetermined value Tcatlmt (e.g. 30 seconds). This catalyst warm-up timer, which is used to count an execution time period of a catalyst warm-up control process, is formed by a upcount timer. The catalyst warm-up control process is executed so as to quickly activate a catalyst, not shown, in a catalyst device, not shown, provided in an exhaust pipe, not shown, of the engine 3.

If the answer to the question of the step 9 is affirmative (YES), it is judged that the catalyst warm-up control is to be executed, and the process proceeds to a step 10, wherein the target fuel pressure Pf_cmd is set to a predetermined catalyst warm-up control value Pf_ast. This predetermined catalyst warm-up control value Pf_ast is preset to a value (e.g. 20 MPa) of the fuel pressure Pf that can maintain a stable combustion state during execution of ignition timing retard control in the catalyst warm-up control.

Then, the fuel pressure control input Upf is calculated in the step 7, followed by terminating the present process.

On the other hand, if the answer to the question of the step 8 or 9 is negative (NO), i.e. if the accelerator pedal is being stepped on or Tcat≧Tcatlmt holds when the engine start control is not being executed, the process proceeds to a step 11, wherein a normal operation value Pf_map is calculated by searching a map shown in FIG. 6 according to the engine speed NE and the accelerator pedal opening AP. In FIG. 6, reference symbols AP1 to AP3 represent predetermined values of the accelerator pedal opening AP in the relationship of AP1<AP2<AP3.

In this map, the normal operation value Pf_map is set to a larger value as the engine speed NE is higher or the accelerator pedal opening AP is larger. This is because as the engine speed NE is higher or the accelerator pedal opening AP is larger, the output demanded of the engine 3 is larger, and therefore a higher fuel pressure Pf is demanded.

In a step 12 following the step 11, the target fuel pressure Pf_cmd is set to the normal operation value Pf_map. Then, the control input Upf is calculated in the step 7, followed by terminating the present process.

Next, a description will be given of a process for calculating the control input Upf in the step 7 described hereinabove, with reference to FIG. 7. First, in a step 20, the first control input Rsld is calculated by the aforementioned equations (1) to (6) and (8) to (10).

Next, the process proceeds to a step 21, wherein it is determined whether the F/C operation flag F_FC is equal to 1. If the answer to this question is affirmative (YES), i.e. if the conditions for executing the F/C operation are satisfied, the process proceeds to a step 22, wherein the amplitude setting value DUD is set to the F/C operation value DUDH. Then, in a step 23, a second control input selection flag F_DSM is set to 1 so as to indicate that the control region is in a region in which the second control input Udsm should be selected as the control input Upf.

On the other hand, if the answer to this question is negative (NO), the process proceeds to a step 24, wherein it is determined whether or not the pressure decreasing control flag F_PDEC is equal to 1. If the answer to this question is affirmative (YES), i.e. if the conditions for executing the pressure decreasing control are satisfied, the process proceeds to a step 25, wherein the amplitude setting value DUD is set to a pressure decreasing control value DUDL. Then, in the step 23, the second control input selection flag F_DSM is set to 1.

On the other hand, if the answer to the question of the step 24 is negative (NO), i.e. if neither the conditions for executing the F/C operation or the conditions for executing the pressure decreasing control are satisfied, the process proceeds to a step 26, wherein the amplitude setting value DUD is set to the normal control value DUDM. Then, the second control input selection flag F_DSM is set to 0 so as to indicate that the fuel supply system 10 is in a control region in which the first control input Rsld should be selected as the control input Upf.

In a step 28 following the step 23 or the step 27, the central value Ucent is calculated by the aforementioned equations (11) to (15). Then, the process proceeds to a step 29, wherein the large differential component value UH and the small differential component value UL are calculated by the aforementioned equations (16) to (22).

Next, in a step 30, the difference δd is calculated by the aforementioned equation (26). Then, in a step 31, the integral value σd is calculated by the aforementioned equation (27).

Next, in a step 32, it is determined whether or not the integral value σd calculated in the step 30 is not smaller than a value of 0. If the answer to this question is affirmative (YES), the modulated value ULdsm is set to DUD in a step 33, whereas if it is negative (NO), the modulated value ULdsm is set to -DUD in a step 34.

In a step 35 following the step 33 or the step 34, the second control input Udsm is set to the sum of the modulated value ULdsm, the large differential component value UH, and the central value Ucent, calculated as described above.

Then, the process proceeds to a step 36, wherein it is determined whether or not the second control selection flag F_DSM is equal to 1. If the answer to this question is affirmative (YES), the process proceeds to a step 37, wherein the control input Upf is set to the second control input Udsm. On the other hand, if the answer to this question is negative (NO), the process proceeds to a step 38, wherein the control input Upf is set to the first control input Rsld. After calculating the control input Upf as described above, the present process is terminated.

Figure 8:
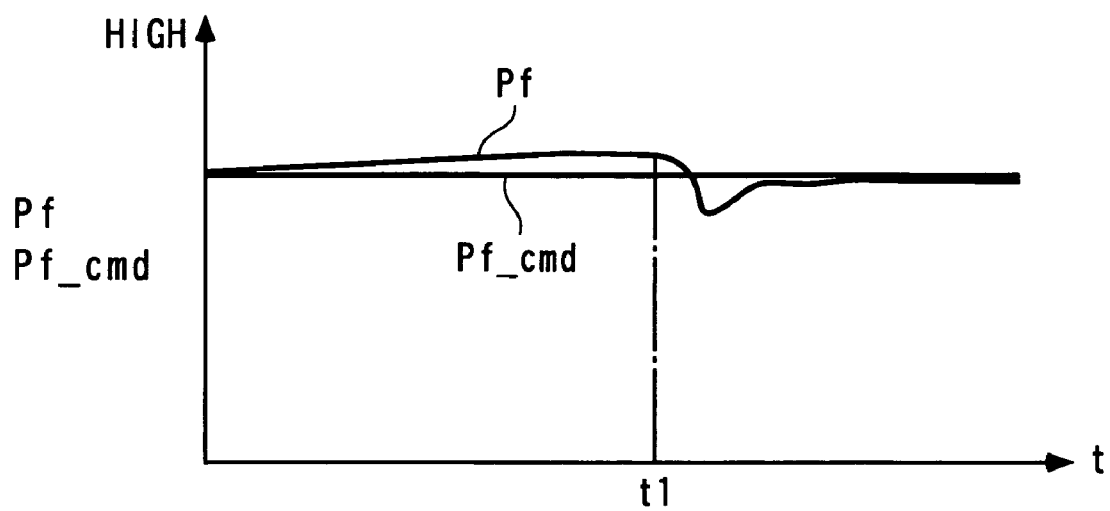
FIG. 8 is a timing diagram showing an example of results of pressure decreasing control of fuel pressure executed by the controller according to the present embodiment.
Figure 9:
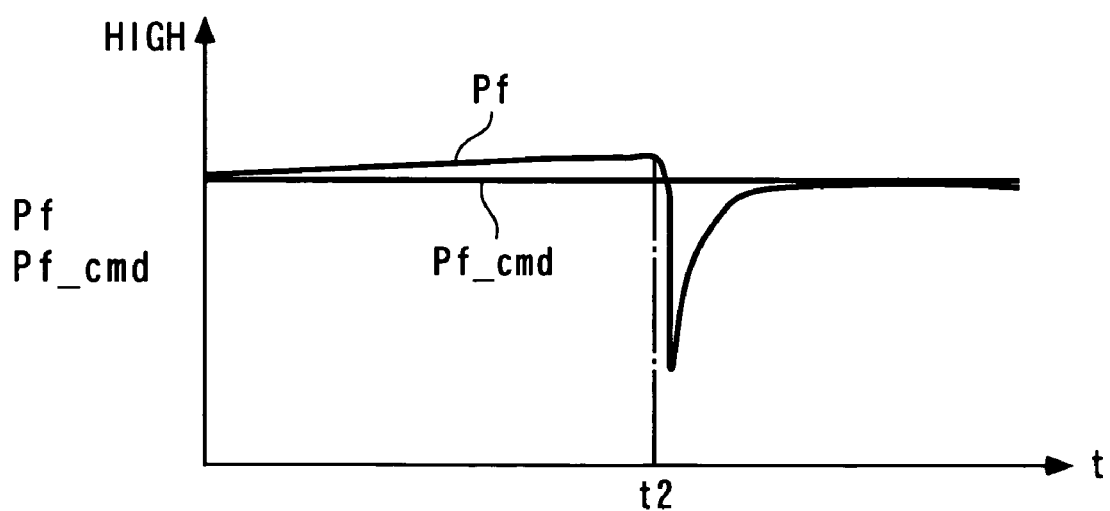
FIG. 9 is a timing diagram showing results of fuel pressure control by Comparative Example.

Next, a description will be given of the results of the control of the fuel pressure Pf by the controller 1 according to the present embodiment constructed as described above, with reference to FIGS. 8 to 10. FIG. 8 shows results of the control when the controller 1 according to the present embodiment executed the pressure decreasing control while holding the target fuel pressure Pf_cmd at a fixed value. FIG. 9 shows results of control the fuel pressure Pf using the first control input Rsld as the control input Upf in executing the pressure decreasing control, by way of Comparative Example.

As is apparent from FIG. 9, according to the results of control of Comparative Example, immediately after the start of the pressure decreasing control (at and after time t2), the fuel pressure Pf largely undershoots the target fuel pressure Pf_cmd under the influence of the nonlinearities of the fuel supply system 10, causing a temporary steep increase in the deviation between the two values. In contrast, according to the results of the control by the present embodiment, shown in FIG. 8, immediately after the start of the pressure decreasing control (at and after time t1), although the fuel pressure Pf slightly undershoots the target fuel pressure Pf_cmd, the deviation between the two values is suppressed to be small, and hence it is understood that the use of the second control input Udsm as the control input Upf makes it possible to properly compensate for the nonlinearities of the fuel supply system 10, and secure the resolution of high-level control.

Figure 10:
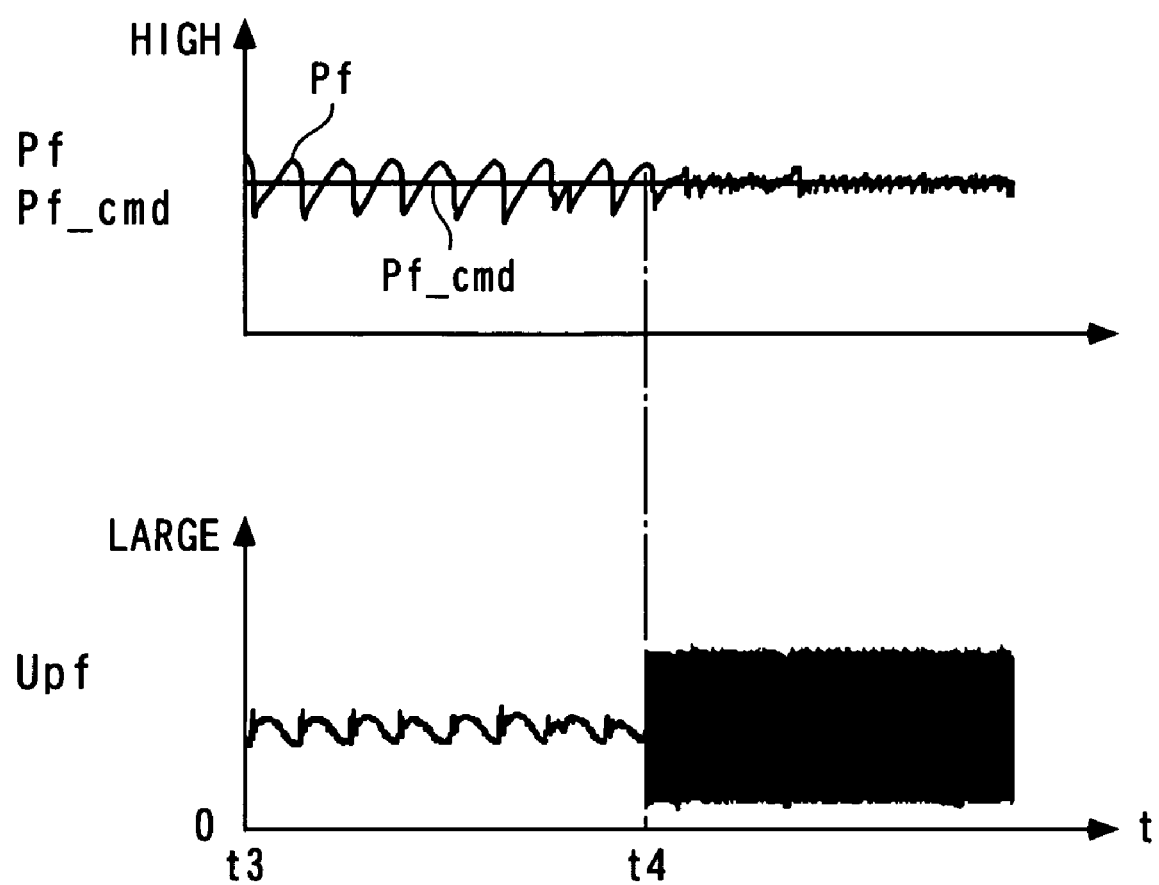
FIG. 10 is a timing diagram showing an example of results of fuel pressure control during fuel cut operation, in which the control input Upf is switched from a first control input Rsld to a second control input Udsm.

FIG. 10 is a timing diagram showing an example of results of fuel pressure control during fuel cut operation, in which the control input Upf is switched from the first control input Rsld to the second control input Udsm at a time point t4.

As is apparent from FIG. 10, during a time period (time point t3 to time point t4) in which the first control input Rsld is used as the control input Upf, the pressure decreasing control and the pressure increasing control are alternately executed, and the fuel pressure Pf does not properly converge to the target fuel pressure Pf_cmd. This is due to the following reasons: As the first reason, in the pressure decreasing control during F/C operation, due to the structural characteristics of the fuel supply system 10, the fuel pressure Pf temporarily largely undershoots the target fuel pressure Pf_cmd at the start of the pressure decreasing control.

As the second reason, in the pressure increasing control, the pressure-increasing operation is constantly executed during operation of the engine 3 since the high-pressure pump 17 is connected to the crankshaft, and the operation for delivery of the fuel pressure increased in pressure into the delivery pipe 13 is intermittently executed since the high-pressure pump is of a volume type. For the above two reasons, when the first control input Rsld is used as the control input Upf, the pressure increasing control and the pressure decreasing control are repeatedly alternately executed without the fuel pressure Pf converging to the target fuel pressure Pf_cmd.

On the other hand, after the control input Upf is switched from the first control input Rsld to the second control input Udsm (at and after time point t4), the fuel pressure Pf is controlled to a state substantially converged to the target fuel pressure Pf_cmd, from which it is understood that the nonlinearities of the fuel supply system 10 are properly compensated for, and the high-level resolution of the fuel pressure control can be secured.

As described heretofore, according to the controller 2 of the present invention, with the two-degree-of-freedom response-specifying control algorithm [equations (1) to (6)], the first control input Rsld is calculated, and the second control input Udsm is calculated by modulating the first control input Rsld with the algorithm [equations (11) to (31)] to which is applied the $\Delta\Sigma$ modulation algorithm. Then, when the fuel pressure Pf is controlled during F/C operation of the engine 3 or when the fuel pressure Pf is decreased during fuel supply operation, the second control input Udsm is selected as the control input Upf, whereas when the fuel pressure Pf is controlled to not to be decreased during fuel supply operation of the engine 3, the first control input Rsld is selected as the control input Upf.

In this case, the first control input Rsld is calculated with the target value filter-type two-degree-of-freedom control algorithm as a combination of the target value filter-type algorithm and the response-specifying control algorithm. Therefore, through the use of the first control input Rsld, the target value filter-type algorithm makes it possible to set the converging speed of the fuel pressure Pf to the target fuel pressure Pf_cmd to a proper value, and separately therefrom, the response-specifying control algorithm makes it possible to properly set the converging behavior of the fuel pressure Pf to the target fuel pressure Pf_cmd. In short, in the calculation of the first control input Rsld, the converging behavior and the converging speed of the fuel pressure Pf to the target fuel pressure Pf_cmd can be properly set independently of each other. The use of the first control input Rsld thus calculated makes it possible to maintain both the converging speed of the fuel pressure Pf to the target fuel pressure Pf_cmd and the converging behavior at high levels, insofar as the fuel supply system 10 is in the control region in which it hardly exhibits the nonlinearities thereof.

Therefore, when the fuel pressure Pf is controlled not to be decreased during fuel supply operation of the engine 3, which corresponds to the above-mentioned case of controlling the fuel pressure Pf in such a control region, the first control input Rsld is selected as the control input Upf, whereby the follow-up speed of the fuel pressure Pf to the target fuel pressure Pf_cmd and the follow-up behavior can be both maintained at high levels. Moreover, under the conditions of the sensitivity of the fuel pressure Pf to the control input Upf being reduced, it is possible to cause the fuel pressure Pf to converge to the target fuel pressure Pf_cmd while avoiding a state in which the amplitude of the control input Upf is reflected on the fuel pressure Pf in a noise-like fashion when the fuel supply system 10 is in the control region in which it hardly exhibits the nonlinearities, which would otherwise be caused when the second control input Udsm is selected as the control input Upf. As a result, the resolution and accuracy of the fuel pressure control can be improved compared with the case of the second control input Udsm being selected as the control input Upf in the control region in which the fuel supply system 10 hardly exhibits the nonlinearities.

On the other hand, when the fuel pressure Pf is controlled in the control region in which the fuel supply system 10 temporarily very strongly exhibits the nonlinearities, in other words, when the fuel pressure Pf is controlled during F/C operation of the engine 3, or when the fuel pressure Pf is controlled to be decreased during fuel supply operation of the engine 3, the second control input Udsm is selected as the control input Upf. As described hereinabove, the second control input Udsm is calculated as a value which has the above-described excellent control characteristics of the first control input Rsld, i.e. the characteristic of being capable of maintaining the follow-up speed of the fuel pressure Pf to the target fuel pressure Pf_cmd and the follow-up behavior of the same at high levels, and is capable of compensating for the nonlinearities of the fuel supply system 10. Therefore, by selecting the second control input Udsm as the control input Upf when the fuel supply system 10 is in a control region in which it temporarily very strongly exhibits the nonlinearities, it is possible to cause the fuel pressure Pf to converge to the target fuel pressure Pf_cmd while compensating for the very strong nonlinearities of the fuel supply system 10. As a result, in the control region in which the fuel supply system 10 temporarily very strongly exhibits the nonlinearities, compared with the case of the first control input Rsld being selected as the control input Upf, it is possible to improve the resolution and accuracy of the fuel pressure control. Moreover, under circumstances in which the first control input Rsld is largely changed and hence the quick responsiveness of the control is demanded, the large differential component value UH contained in the second control input Udsm makes it possible to secure such quick responsiveness.

As described heretofore, it is possible to improve the resolution and control accuracy of the fuel pressure control both in the control region in which the fuel supply system 10 temporarily very strongly exhibits the nonlinearities, and the control region in which it does not exhibit the nonlinearities.

Further, since the central value Ucent of the second control input Udsm is calculated as a value following macroscopic changes in the first control input Rsld, compared with the conventional cases where the central value of the amplitude of the modulated control input does not change, it is possible to set the amplitude of the second control input Udsm to a smaller value. As a result, even when the first control input Rsld is large in the range of change, it is possible to secure the resolution and accuracy of the control at high levels. Moreover, since the amount of change Ducent of the central value Ucent is calculated as a value obtained by multiplying the difference Euc by the update gain Keu which satisfies the relationship of 0<Keu<<1, when −EPS<Euc<EPS holds, and hence even when the first control input Rsld has suddenly changed, it is calculated as a value which gently follows the changed value of the first control input Rsld. As a result, at the start of decreasing the pressure, it is possible to suppress the fuel pressure from undershooting the target fuel pressure Pf_cmd.

Further, when the fuel pressure Pf is controlled during the F/C operation of the engine 3, the amplitude setting value DUD for setting the amplitude of the second control input Udsm is set to the value DUDH which is larger than when the fuel pressure Pf is controlled to be decreased during fuel supply operation of the engine 3. Therefore, the amplitude of the modulated value ULdsm is set to a larger value than when the pressure decreasing control is executed during fuel supply operation. This makes it possible to improve the resolution of the fuel pressure control, and thereby accurately execute the fuel injection control upon resuming the fuel injection. As a result, it is possible to improve the accuracy of the air-fuel ratio control.

Further, since the algorithm for calculating the modulated value ULdsm, there is employed the algorithm to which the ΔΣ modulation algorithm is applied. Therefore, due to the characteristics of the ΔΣ modulation algorithm, as the small differential component value UL becomes closer to a value of 0, in other words, as the first control input Rsld becomes less changed when the fuel pressure Pf is close to the target fuel pressure Pf_cmd, the inverting frequency of the second control input Udsm becomes higher. As a result, compared with the case where as the second control input Udsm, there is employed a value obtained by modulating the first control input Rsld using PWM or dithering in which the inverting frequency is fixed, it is possible to improve the convergence of the fuel pressure Pf to the target fuel pressure Pf_cmd.

Further, when the control algorithm in which the integral value of the difference between the fuel pressure Pf and the target fuel pressure Pf_cmd is used for disturbance compensation, as the algorithm for calculating the first control input Rsld, if the fuel supply system 10 receives a disturbance, due to the disturbance compensation effect of the integral value, the difference between the fuel pressure Pf and the target fuel pressure Pf_cmd exhibits an oscillatory swing-back behavior or temporarily becomes too large. In contrast, according to this controller, the disturbance estimate for compensating for the disturbance received by the fuel supply system 10 is calculated based on the fuel pressure Pf and the first control input Rsld with the estimation algorithm, and the first control input Rsld is calculated based on the disturbance estimate with the two-degree-of-freedom response-specifying control algorithm. Therefore, when the fuel supply system 10 receives a disturbance, differently from the case where the integral value of the difference between the fuel pressure Pf and the target fuel pressure Pf_cmd is used, it is possible to compensate for the influence of the disturbance while preventing the difference between the fuel pressure Pf and the target fuel pressure Pf_cmd from exhibiting the oscillatory swing-back behavior or becoming too large, thereby causing the fuel pressure Pf to speedily converge to the target fuel pressure Pf_cmd.

Although in the present embodiment, as the algorithm for calculating the second control input Udsm by modulating the first control input Rsld, the algorithm [equations (11) to (31)] to which the ΔΣ modulation algorithm is applied is used by way of example, this is not limitative, but any suitable algorithm may be employed insofar as it is capable of calculating the second control input Udsm by modulating the first control input Rsld. For example, as the algorithm for modulating the first control input Rsld, there may be employed a PWM (Pulse Width Modulation) algorithm or an algorithm which modulates the first control input Rsld by dithering.

Figure 7:
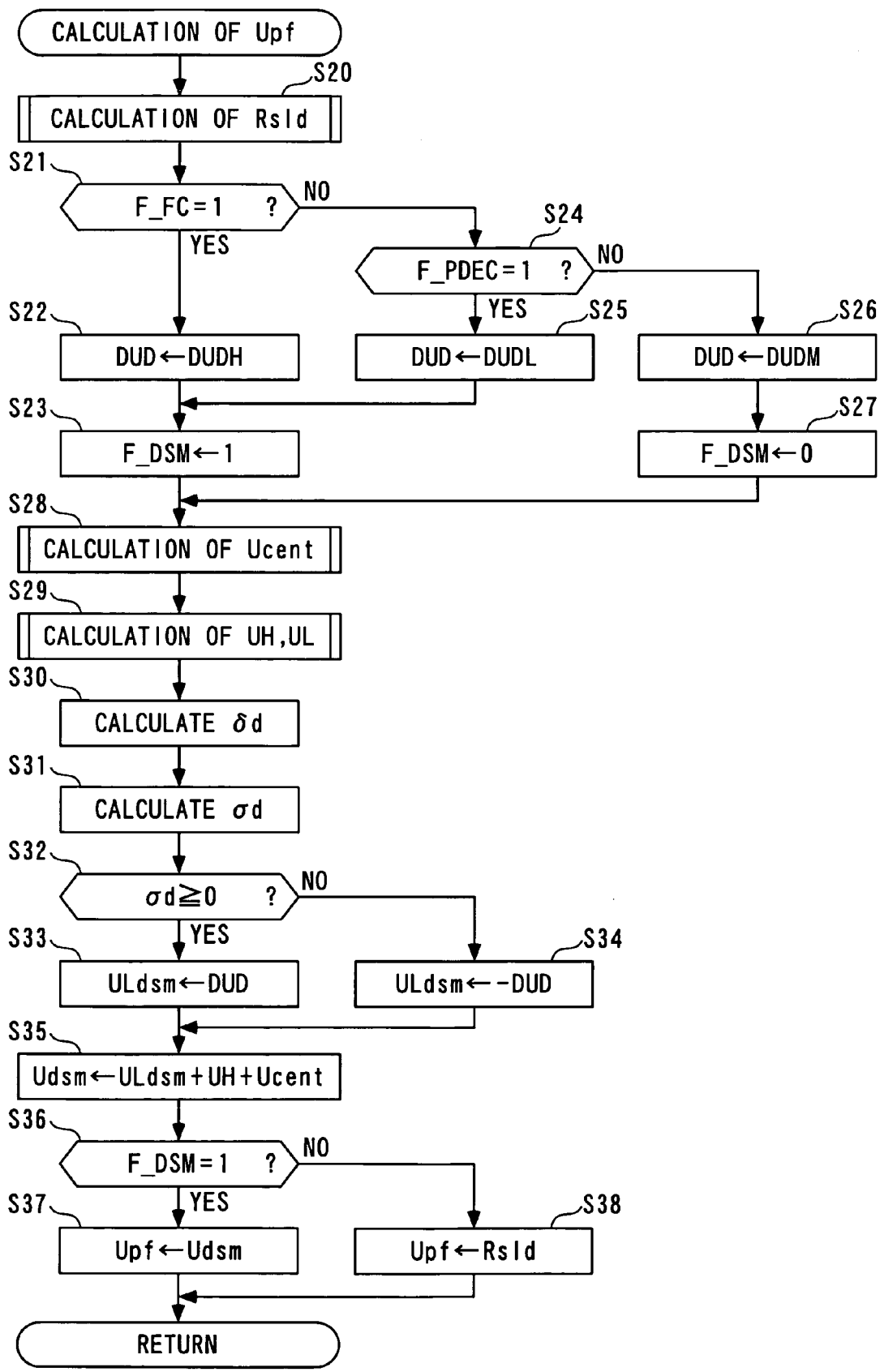
FIG. 7 is a flowchart showing a process for calculating the control input Upf.

Further, in the modulating section 64 and the steps 30 to 34 in FIG. 7 of the present embodiment, the modulated value ULdsm may be calculated with an algorithm to which is applied, in place of the algorithm expressed by the aforementioned equations (26) to (30), a modulation algorithm expressed by the following equations (32) to (37):

$$\sigma r(k)=\sigma r(k-1)+UL(k) \tag{32}$$

$$\sigma u(k)=\sigma u(k-1)+ULdsm(k-1) \tag{33}$$

$$\delta d(k)=\sigma r(k)-\sigma u(k) \tag{34}$$

$$ULdsm(k)=Fn1(\delta d(k)) \tag{35}$$

when $\delta d(k)<0 Fn1(\delta d(k))=-DUD(k)$ (36)

when $(\delta d(k)<0 Fn1(\delta d(k))=-DUD(k)$ (37)

Even when the modulated value Uldsm is calculated with the above algorithm, and further, the second control input Udsm is calculated using the modulated value ULdsm by the aforementioned equation (31), it is possible to obtain the same advantageous effects as obtained by the embodiment described hereinabove. Particularly, as the small differential component value UL becomes closer to a value of 0, that is, as the first control input Rsld becomes less changed when the fuel pressure Pf is close to the target fuel pressure Pf_cmd, the inverting frequency of the second control input Udsm becomes higher, so that compared with the case where the second control input Udsm modulated by the PWM or dithering whose inverting frequency is fixed, it is possible to improve the convergence of the fuel pressure Pf to the target fuel pressure Pf_cmd.

Further, in the modulating section 64 and the steps 30 to 34 in FIG. 7 of the present embodiment, the modulated value ULdsm may be calculated with an algorithm to which is applied, in place of the algorithm expressed by the aforementioned equations (26) to (30), a Δ modulation algorithm expressed by the following equations (38) to (42):

$$\sigma u(k)=\sigma u(k-1)+ULdsm(k-1) \tag{38}$$

$$\delta d(k)=UL(k)-\sigma u(k) \tag{39}$$

$$ULdsm(k)=Fn1(\delta d(k)) \tag{40}$$

when $\delta d(k) \geq 0 Fn1(\delta d(k))=DUD(k)$ (41)

when $\delta d(k)<0 Fn1(\delta d(k))=-DUD(k)$ (42)

Even when the modulated value Uldsm is calculated with above algorithm, and further, the second control input Udsm is calculated using the modulated value ULdsm by the aforementioned equation (31), it is possible to obtain the same advantageous effects as obtained by the embodiment described hereinabove. Particularly, as the small differential component value UL becomes closer to a value of 0, that is, as the first control input Rsld becomes less changed when the fuel pressure Pf is close to the target fuel pressure Pf_cmd, the inverting frequency of the second control input Udsm becomes higher, so that compared with the case where the second control input Udsm modulated by the PWM or dithering whose inverting frequency is fixed, it is possible to improve the convergence of the fuel pressure Pf to the target fuel pressure Pf_cmd.

Further, in the present embodiment, the controller according to the present invention is applied to the fuel supply system 10 as the fluid circuit system or the plant, by way of example, this is not limitative, but the present invention can be applied to various fluid circuit systems and plants which include a control region in which nonlinearities are temporarily very strongly exhibited and a control region in which the nonlinearities are hardly exhibited.

It is further understood by those skilled in the art that the foregoing are preferred embodiments of the invention, and that various changes and modifications may be made without departing from the spirit and scope thereof.

What is claimed is:
1. A controller that controls a control amount of a plant by a control input, comprising:
control amount-detecting means for detecting the control amount;

target value-setting means for setting a target value as a target of the control amount;

first control input-calculating means for calculating a first control input for controlling the detected control amount such that the detected control amount is caused to converge to the set target value, with a predetermined control algorithm;

second control input-calculating means for calculating a second control input by modulating the first control input with an algorithm to which is applied a predetermined modulation algorithm; and control input-selecting means for selecting one of the first control input and the second control input as the control input, depending on conditions of the plant.

2. A controller as claimed in claim 1, wherein said second control input-calculating means comprises:

central value-setting means for setting a central value as a center of an amplitude of the second control input according to the first control input; and amplitude setting means for setting the amplitude of the second control input to a value smaller than a range between a maximum value and a minimum value that the first control input can assume.

3. A controller as claimed in claim 1, wherein the predetermined control algorithm is an algorithm to which is applied a target value filter-type two-degree-of-freedom control algorithm as a combination of a predetermined target value filter-type algorithm and a predetermined response-specifying control algorithm.

4. A controller as claimed in claim 1, wherein the predetermined modulation algorithm is one of a $\Delta\Sigma$ modulation algorithm, a $\Sigma\Delta$ modulation algorithm, and a $\Delta$ modulation algorithm.

5. A controller as claimed in claim 1, further comprising disturbance estimate-calculating means for calculating a disturbance estimate for compensating for a disturbance which the plant receives, based on the control amount and the first control input, with a predetermined estimation algorithm, and wherein said first control input-calculating means calculates the first control input based on the calculated disturbance estimate with the predetermined control algorithm.

6. A controller that controls fluid pressure of a fluid circuit system in which the fluid pressure is increased and decreased by opening and closing of a pressure increasing passage and a pressure decreasing passage, comprising:

a valve that opens and closes the pressure increasing passage and the pressure decreasing passage;

an actuator that actuates said valve;

fluid pressure-detecting means for detecting the fluid pressure;

target value-setting means for setting a target value as a target of the fluid pressure;

first control input-calculating means for calculating a first control input for controlling the detected fluid pressure such that the detected fluid pressure is caused to converge to the set target value, with a predetermined control algorithm;

second control input-calculating means for calculating a second control input by modulating the first control input with an algorithm to which is applied a predetermined modulation algorithm; and control input-selecting means for selecting one of the first control input and the second control input as the control input to said actuator, depending on conditions of the fluid-circuit system.

7. A controller as claimed in claim 6, wherein said second control input-calculating means comprises:

central value-setting means for setting a central value as a center of an amplitude of the second control input according to the first control input; and amplitude setting means for setting the amplitude of the second control input to a value smaller than a range between a maximum value and a minimum value that the first control input can assume.

8. A controller as claimed in claim 6, wherein the predetermined control algorithm is an algorithm to which is applied a target value filter-type two-degree-of-freedom control algorithm as a combination of a predetermined target value filter-type algorithm and a predetermined response-specifying control algorithm.

9. A controller as claimed in claim 6, wherein the predetermined modulation algorithm is one of a $\Delta\Sigma$ modulation algorithm, a $\Sigma\Delta$ modulation algorithm, and a $\Delta$ modulation algorithm.

10. A controller as claimed in claim 6, further comprising disturbance estimate-calculating means for calculating a disturbance estimate for compensating for a disturbance which the fluid circuit system receives, based on the fluid pressure and the first control input, with a predetermined estimation algorithm, and wherein said first control input-calculating means calculates the first control input based on the calculated disturbance estimate with the predetermined control algorithm.

11. A controller as claimed in claim 6, wherein the fluid circuit system is a fuel supply system that supplies fuel to an internal combustion engine;

wherein the fluid pressure is a fuel pressure in the fuel supply system; and wherein said control input-selecting means selects the second control input as the control input, when the fuel pressure is controlled to be deceased.

12. A controller as claimed in claim 6, wherein the fluid circuit system is a fuel supply system that supplies fuel to an internal combustion engine;

wherein the fluid pressure is a fuel pressure in the fuel supply system; and wherein said control input-selecting means selects the second control input as the control input, when fuel supply from the fuel supply system to the engine is interrupted.

* * * * *